(12) United States Patent
Hatanaka et al.

(10) Patent No.: US 8,105,561 B2
(45) Date of Patent: Jan. 31, 2012

(54) CATALYST FOR PURIFICATION OF EXHAUST GAS, REGENERATION METHOD FOR THE CATALYST, AND APPARATUS AND METHOD FOR PURIFICATION OF EXHAUST GAS USING THE CATALYST

(75) Inventors: Miho Hatanaka, Aichi-gun (JP); Toshitaka Tanabe, Aichi-gun (JP); Yasutaka Nagai, Aichi-gun (JP); Toshio Yamamoto, Nishikamo-gun (JP); Kazuhiko Dohmae, Nisshin (JP); Nobuyuki Takagi, Susono (JP); Masahide Miura, Susono (JP); Yasuo Ikeda, Toyota (JP)

(73) Assignees: Kabushiki Kaisha Toyota Chuo Kenkyusho, Aichi-Gun (JP); Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 12/225,692
(22) PCT Filed: Dec. 1, 2006
(86) PCT No.: PCT/JP2006/324068
§ 371 (c)(1),
(2), (4) Date: Oct. 15, 2008
(87) PCT Pub. No.: WO2007/111004
PCT Pub. Date: Oct. 4, 2007

(65) Prior Publication Data
US 2009/0170689 A1 Jul. 2, 2009

(30) Foreign Application Priority Data

Mar. 28, 2006 (JP) .................. 2006-089120
Mar. 28, 2006 (JP) .................. 2006-089177
Mar. 28, 2006 (JP) .................. 2006-089186
Mar. 28, 2006 (JP) .................. 2006-089193

(51) Int. Cl.
*B01J 23/40* (2006.01)
*B01J 23/38* (2006.01)
*B01J 23/42* (2006.01)
*B01D 53/56* (2006.01)
*B01D 53/34* (2006.01)
*G05D 23/00* (2006.01)

(52) U.S. Cl. ....... 423/213.5; 422/111; 502/38; 502/302; 502/303; 502/304; 502/325; 502/326; 502/327; 502/328; 502/330; 502/332; 502/334; 502/338; 502/339; 502/340; 502/341

(58) Field of Classification Search .......... 423/210, 423/212, 213.7, 239.1, 213.5, 247; 502/20–50, 502/102, 103, 304, 303, 302, 326, 327, 328, 502/332, 341, 340, 325, 330, 334, 338, 339; 422/105, 107–111, 116

See application file for complete search history.

(56) References Cited

U.S. PATENT DOCUMENTS 6,514,905 B1 * 2/2003 Hanaki et al. ................. 502/328
(Continued)

FOREIGN PATENT DOCUMENTS
JP A-5-168927 7/1993
(Continued)

OTHER PUBLICATIONS

Apr. 18, 2011 Supplementary European Search Report issued in EP 06 82 3547.2.
(Continued)

Primary Examiner — Wayne Langel
Assistant Examiner — Syed Iqbal
(74) Attorney, Agent, or Firm — Oliff & Berridge, PLC

(57) ABSTRACT

A catalyst for purification of exhaust gas in which a noble metal is supported on a metal-oxide support wherein, in a oxidation atmosphere, the noble metal exists on the surface of the support in high oxidation state, and the noble metal binds with a cation of the support via an oxygen atom on the surface of the support to form a surface oxide layer and, in a reduction atmosphere, the noble metal exists on the surface of the support in a metal state, and an amount of noble metal exposed at the surface of the support, measured by CO chemisorption, is 10% or more in atomic ratio to a whole amount of the noble metal supported on the support.

18 Claims, 6 Drawing Sheets

U.S. PATENT DOCUMENTS

| | | | |
|---|---|---|---|
| 2005/0014638 A1* | 1/2005 | Miura | 502/304 |
| 2005/0207956 A1* | 9/2005 | Vierheilig | 423/213.2 |
| 2006/0217263 A1* | 9/2006 | Kawamoto et al. | 502/304 |
| 2009/0069174 A1* | 3/2009 | Morikawa et al. | 502/261 |

FOREIGN PATENT DOCUMENTS

| | | |
|---|---|---|
| JP | A-05-317652 | 12/1993 |
| JP | A-06-099069 | 4/1994 |
| JP | A-07-075737 | 3/1995 |
| JP | A-09-192487 | 7/1997 |
| JP | A-10-174866 | 6/1998 |
| JP | A-11-013458 | 1/1999 |
| JP | A-2000-202309 | 7/2000 |
| JP | A-2002-079053 | 3/2002 |
| JP | A-2003-074334 | 3/2003 |
| JP | A-2003-126694 | 5/2003 |
| JP | A-2003-220336 | 8/2003 |
| JP | A-2003-245553 | 9/2003 |
| JP | A-2004-041866 | 2/2004 |
| JP | A-2004-141833 | 5/2004 |
| JP | A-2004-243177 | 9/2004 |
| JP | A-2004-340637 | 12/2004 |
| JP | A-2005-23827 | 9/2005 |
| JP | A-2005-270882 | 10/2005 |
| JP | A-2006-021141 | 1/2006 |
| JP | A-2006-055748 | 3/2006 |
| JP | A-2006-346587 | 12/2006 |
| WO | WO 2006/009327 A1 | 1/2006 |

OTHER PUBLICATIONS

Liotta, L.F., "A Study of the behaviour of Pt supported on $CeO_2$-$ZrO_2$/$Al_2O_3$-BaO as $NO_x$ storage-reduction catalyst for the treatment of lean burn engine emissions" Catalysis Today, Jan. 1, 2002, pp. 439-449, vol. 75, Elsevier, NL.

Aug. 19, 2011 Japanese Decision of Rejection of Amendment issued in Japanese Patent Application No. 2006-325206 (with translation).

Aug. 19, 2011 Japanese Decision of Rejection issued in Japanese Patent Application No. 2006-325206 (with translation).

* cited by examiner

CATALYST FOR PURIFICATION OF EXHAUST GAS, REGENERATION METHOD FOR THE CATALYST, AND APPARATUS AND METHOD FOR PURIFICATION OF EXHAUST GAS USING THE CATALYST

TECHNICAL FIELD

The present invention relates to a catalyst for purification of exhaust gas, a regeneration method of the catalyst, and an apparatus and a method for purification of exhaust gas using the catalyst.

BACKGROUND OF THE INVENTION

Catalysts for purification of exhaust gas have been conventionally used for removing harmful components such as hydrocarbon gas (HC), carbon monoxide (CO) and nitrogen oxides ($NO_x$) in exhaust gas from automobile engines. As such catalysts for purification of exhaust gas, three-way catalysts are known that simultaneously clean HC, CO and $NO_x$ in exhaust gas combusted in the theoretical air-fuel ratio and are generally composed of: a substrate (support substrate) made of cordierite, a metal foil, or the like, and formed in a honeycomb shape; a support (catalyst supporting layer) made of an active alumina powder, a silica powder, or the like, and formed on the substrate surface; and a catalyst component made of a noble metal such as platinum, and supported on the support.

For example, Japanese Unexamined Patent Application Publication No. Hei 5-317652 (Document 1) discloses a catalyst for purification of exhaust gas produced by supporting an alkaline earth metal oxide and platinum on a support formed of a porous body. In addition, Japanese Unexamined Patent Application Publication No. Hei 6-99069 (Document 2) discloses a catalyst for purification of exhaust gas comprising a support substrate and a catalyst component layer produced by supporting, on the surface of the support substrate, catalyst components of 1 g to 20 g of palladium, of 50 g to 250 g of alumina, of 10 g to 150 g of cerium oxide, and of 8 g to 50 g of barium oxide per liter of the support substrate volume. Additionally, Japanese Unexamined Patent Application Publication No. Hei 10-174866 (Document 3) discloses a catalyst for purification of exhaust gas comprising a first catalyst layer produced by supporting at least palladium on a first porous support, and a second catalyst layer formed on the surface of the first catalyst layer and produced by supporting at least rhodium on a second porous support, wherein the mass of the palladium, supported on the first catalyst layer, per unit mass of the first porous support is larger than the mass of the rhodium, supported on the second catalyst layer, per unit mass of the second porous support.

However, when the catalysts for purification of exhaust gas as described in Documents 1 to 3 is exposed to high-temperature exhaust gas (particularly, 800° C. or higher), such problem occurs that catalytic activity will be lowered because particles of a noble metal having catalytic activity such as platinum, rhodium or palladium supported on its support are aggregated and then sintering (particle growth) occurs to decrease the specific surface area.

Furthermore, Japanese Unexamined Patent Application Publication No. 2004-41866 (Document 4) discloses a catalyst for purification of exhaust gas comprising a composite oxide of a perovskite structure expressed by a specific formula, the composite oxide including: at least one element selected from rare earth elements that surely contain a rare earth element and do not contain a rare earth element capable of having a valence smaller than 3; at least one element selected from Al and transition elements except cobalt, palladium and the rare earth elements; and palladium. However, in the catalyst for purification of exhaust gas as described in Document 4, a noble metal is solid-dissolved in a perovskite structure and is stable in an oxidation state, thereby posing the problem that the noble metal contained in its structure has a difficulty in functioning as the active site of a catalyst, so that the catalytic activity is not still sufficient.

Moreover, Japanese Unexamined Patent Application Publication No. 2003-220336 (Document 5) discloses a catalyst for purification of exhaust gas comprising a support containing cerium oxide and a catalyst metal including a transition metal and a noble metal and supported on at least the cerium oxide, wherein the relationship between the atomic ratio of the transition metal to the cerium atom and the atomic ratio of the transition metal to the noble metal falls in a specified range. However, the catalyst for purification of exhaust gas as described in Document 5 is not still sufficient in that the catalytic activity is regenerated by re-dispersing a noble metal by regeneration processing.

In addition, Japanese Unexamined Patent Application Publication No. 2005-270882 (Document 6) discloses a catalyst produced by supporting one kind, or two kinds or more, of catalyst metal particles including one kind, or two kinds or more, of transition metals or transition metal oxides of an atomic number of from 10 to 50,000 on a porous support including oxides of one kind, or two kinds or more, of ceria, ceria-zirconia, ceria-zirconia-yttria and ceria-lanthanum-zirconia. Moreover, Japanese Unexamined Patent Application Publication No. 2002-79053 (Document 7) discloses a catalyst for purification of exhaust gas produced by coating a fire-proof three-dimensional structure with a catalyst active component containing zirconium oxide composition that contains at least one kind of noble metals, fire-proof inorganic oxide, cerium and lanthanum and has a single structure of zirconium oxide having a crystal structure of a tetragonal form. Furthermore, Japanese Unexamined Patent Application Publication No. 2004-141833 (Document 8) discloses a catalyst for purification of exhaust gas, in which a noble metal is supported on metal oxide particles containing ceria and zirconia, and the metal oxide particles have a central portion containing more ceria than zirconia and a surface layer containing more zircinia than ceria. In addition, Japanese Unexamined Patent Application Publication No. 2004-243177 (Document 9) discloses a catalyst for purification of exhaust gas, in which a noble metal is supported on composite oxide particles containing at least $CeO_2$ and $ZrO_2$ in each particle, in which the relation $0.5 \leq C_{Zr}/C_{Ce} \leq 1.5$ is satisfied when $C_{Ce}$ represents % by weight of $CeO_2$ of the composite oxide powder and $C_{Zr}$ represents the % by weight of $ZrO_2$ of the composite oxide powder, and in which the noble metal is supported on the composite oxide powder by using an aqueous noble metal salt solution having a pH value lower than that of a suspension produced by immersing the composite oxide powder in pure water.

However, in the catalyst as described in Document 6, because a noble metal is supported as a cluster to thereby attempt thermal stabilization of the noble metal particles, there is a problem that, if a noble metal resistant to a higher temperature is used, the catalytic activity per unit amount of the noble metal is lowered. Additionally, in a catalyst for purification of exhaust gas as described in Document 7, the number of noble metal holding sites is insufficient, thereby posing the problem of the noble metal grain-growing to lower the catalytic activity. Moreover, since the catalysts for purification of exhaust gas as described in Documents 8 and 9 are not uniform in the compositions of cerium and zirconium within the support particles, the heat-proof is inferior, and therefore they have insufficient inhibition of the grain growth of the noble metal. Furthermore, in the catalysts for purification of exhaust gas as described in Document 6 to 9, the catalytic activity per unit amount of a noble metal after use for a long period of time is insufficient and sufficient catalytic activity is not regenerated by regeneration processing.

On the other hand, for solving the problem of the catalytic activity being lowered by sintering as described above, various methods for regenerating catalysts for purification of exhaust gas in which grain growth is generated in noble metal particles have been developed. For instance, Japanese Unexamined Patent Application Publication No. Hei 7-75737 (Document 10) discloses a method for regenerating a catalyst for purification of exhaust gas produced by supporting a noble metal as an active species in an inorganic porous matrix that contains causing halogen to act on the catalyst to generate a halide of a noble metal on the matrix and then removing the halogen from the halide. However, in the method of regenerating a catalyst for purification of exhaust gas, in which method halogen is caused to act on the catalyst as described in Document 10, regeneration of the catalyst is very difficult in a state in which the catalyst is installed in an exhaust system of an internal combustion engine, and there is a limit on shortening of the time needed for regeneration processing by re-dispersing the gain grown noble metal to regenerate the catalytic activity.

In addition, Japanese Unexamined Patent Application Publication No. 2000-202309 (Document 11) discloses a method in which oxidation treatment is applied to a catalyst for purification of exhaust gas comprising a support containing at least one species selected from alkaline earth metal oxides and rare earth oxides, and platinum supported on the support, and subsequently reduction treatment is applied to the catalyst. However, even the method described in Document 11 is insufficient from the viewpoint of the shortening of time and reducing of temperature, needed for regeneration processing by re-dispersing gain grown platinum particles to regenerate the catalytic activity.

DISCLOSURE OF THE INVENTION

The present invention has been made in consideration of the above-described problems in the conventional techniques. An object of the present invention is to provide a catalyst for purification of exhaust gas that can sufficiently inhibit aggregation of noble metal particles to sufficiently inhibit grain growth of the noble metal even if exposed to high temperature exhaust gas for a long period of time, thereby being capable of sufficiently inhibiting lowering of catalytic activity and can re-disperse the noble metal particles in a short time to readily regenerate catalytic activity when subjected to grain growth upon use even if the noble metal particles are in a relatively low temperature region, as well as is capable of easily regenerating itself albeit in a state in which the catalyst is installed in an exhaust system of an internal combustion engine and a method for regenerating the catalyst for purification of exhaust gas, and an apparatus for purification of exhaust gas and a method for purification of exhaust gas using the catalyst for purification of exhaust gas.

The present inventors have earnestly studied in order to achieve the above object. As a result, the inventors have found that the grain growth of a noble metal can be surprisingly inhibited over a long period by a specific catalyst having a surface oxide layer produced by binding the noble metal with a cation of a support via an oxygen atom on the surface of the support to be able to sufficiently inhibit lowering of the catalytic activity. In addition, they found that a catalyst can be efficiently regenerated by subjecting this catalyst for purification of exhaust gas to oxidation and reduction treatments even if the catalyst is used and a noble metal is grain-grown, having led to completion of the present invention.

A catalyst for purification of exhaust gas of the present invention is a catalyst for purification of exhaust gas in which a noble metal is supported on a metal-oxide support, wherein in a oxidation atmosphere, the noble metal exists on the surface of the support in high oxidation state, and the noble metal binds with a cation of the support via an oxygen atom on the surface of the support to form a surface oxide layer, and in a reduction atmosphere, the noble metal exists on the surface of the support in a metal state, and an amount of noble metal exposed at the surface of the support, measured by CO chemisorption, is 10% or more in atomic ratio to a whole amount of the noble metal supported on the support.

In the catalyst for purification of exhaust gas of the present invention, the noble metal is preferably at least one element selected from the group consisting of platinum, palladium and rhodium.

In addition, in the catalyst for purification of exhaust gas of the present invention, a value of the binding energy of the 1s orbital of an oxygen atom within the support preferably indicates a value of 531 eV or less.

Additionally, in the catalyst for purification of exhaust gas of the present invention, an electronegativity of at least one cation among cations in the support is preferably lower than that of zirconium.

Moreover, in the catalyst for purification of exhaust gas of the present invention, it is preferable that a molar ratio of a cation to the noble metal (cation/noble metal) is 1.5 or more, the cation being exposed at the surface of the support and having an electronegativity lower than the electronegativity of zirconium.

Furthermore, in the catalyst for purification of exhaust gas of the present invention, the support preferably contains a composite oxide of zirconia and/or alumina, and at least one element selected from the group consisting of alkaline earth metal elements, rare earth elements and 3A group elements, more preferably contains a composite oxide of zirconia and/or alumina and at least one element selected from the group consisting of magnesium, calcium, barium, lanthanum, cerium, neodymium, praseodymium, yttrium and scandium.

In addition, it is not known exactly why the object is achieved by a catalyst for purification of exhaust gas of the present invention, but the present inventors speculate as follows. That is, in a catalyst for purification of exhaust gas of the present invention, the metal-oxide support (preferably a support in which the electronegativity of a cation in the metal-oxide support is lower than that of zirconium and the value of the binding energy of the 1s orbital of the oxygen atom within the metal-oxide support indicates a value of 531 eV or less) shows extremely strong interaction with a noble metal. Additionally, in a catalyst for purification of exhaust gas of the present invention comprising such a support, in an oxidation atmosphere, a surface oxide layer is formed, as illustrated in FIG. 1, in which a noble metal binds a cation of a support via an oxygen atom of the surface of the support. Also, in a catalyst for purification of exhaust gas of the present invention, because such a surface oxide layer is formed, the grain growth of a noble metal can be sufficiently inhibited even though the catalyst is exposed to high temperature exhaust gas for a long period of time. Furthermore, in a catalyst for purification of exhaust gas of the present invention, in a reduction atmosphere, the noble metal becomes a metal state on the surface of the support and the amount of noble metal exposed to the surface of the support measured by CO chemisorption is 10% or more in atomic ratio to a whole amount of the noble metal, and thus the noble metal serving as an active site of the catalyst is stably present on the surface of the support in a high dispersion state (in a highly dispersed state as fine particles), maintaining highly catalytic activity.

Further, even when a catalyst for purification of exhaust gas of the present invention is used for a long period to grain-grow, a noble metal exhibits strong interaction at its interface with the support to form a surface oxide layer by heating the catalyst in an oxidation atmosphere containing oxygen (preferably heated at 500° C. to 1000° C.) and is gradually dispersed in a dispersed state on the surface of the support. As a result, the noble metal on the support becomes a highly dispersed and supported state in an oxide state by oxidation treatment for a relatively short time (re-dispersion). Next, the noble metal in the oxide state is reduced to a metal state by reduction treatment, whereby the catalytic activity is regenerated.

A catalyst for purification of exhaust gas of the present invention preferably satisfies Condition (I) below.

<Condition (I)>

The catalyst further includes an addition component supported on the support, and containing at least one element selected from the group consisting of alkaline earth metal elements, rare earth elements and 3A group elements, wherein an amount of the noble metal supported on the support ranges from 0.05% to 2% by mass to the mass of the catalyst, and a molar ratio (amount of addition component/amount of noble metal) of an amount of the addition component supported on the support to the amount of the noble metal ranges from 0.5 to 20 in terms of metal.

When a catalyst for purification of exhaust gas of the present invention satisfies Condition (I), the addition component contains preferably at least one element selected from the group consisting of magnesium, calcium, neodymium, praseodymium, barium, lanthanum, cerium, yttrium and scandium.

In addition, in this case, the catalyst for purification of exhaust gas preferably comprises iron supported on the support, wherein a molar ratio (amount of iron/amount of noble metal) of an amount of the iron supported on the support to the amount of the noble metal ranges from 0.8 to 12 in terms of metal.

The present inventors have found that, when a catalyst for purification of exhaust gas of the present invention satisfies Condition (I), the generation of grain growth of a noble metal can be surprisingly sufficiently inhibited for a long period of time to thereby sufficiently inhibit lowering of catalytic activity and further found that the adoption of oxidation and reduction treatments applied to such a catalyst for purification of exhaust gas can shorten the time needed for regeneration processing and decrease the temperature, thereby efficiently regenerating the catalytic activity.

Additionally, in this case, the reason why the above object is achieved is not still certain, but the present inventors speculate as follows. That is to say, in a catalyst for purification of exhaust gas satisfying Condition (I), a composite oxide (preferably a composite oxide in which the value of the binding energy of the oxygen 1s orbital indicates a value of 531 eV or less and the electron density of the oxygen is high) of zirconia and/or alumina and at least one element selected from the group consisting of the alkaline earth metal elements, rare earth elements and the 3A group elements shows extremely strong interaction with the noble metal. Also, because an addition material produced by containing at least one addition element selected from the group consisting of the alkaline earth metal elements, rare earth elements and the 3A group elements is supported on a support, the basicity of the support is increased, whereby the support indicates further strong interaction with the noble metal. Therefore, a catalyst for purification of exhaust gas satisfying Condition (I), even if exposed to high temperature exhaust gas for a long time, the grain growth of the noble metal particles can be more sufficiently inhibited, thereby inhibiting further sufficiently lowering of the catalytic activity.

Furthermore, when a catalyst for purification of exhaust gas satisfying Condition (I) is used for a long period of time to generate grain growth, strong interaction occurs at the interface between noble metal particles supported in a grain-grown state and the support. Because of this, heating the catalyst in an oxidation atmosphere containing oxygen (preferably heating at 500° C. to 1000° C.) causes the noble metal to form a composite oxide and a metal oxide with the support, so that the noble metal gradually disperses in a state spread on the support surface. As a result, the noble metal on the support becomes a highly dispersed and supported state in an oxide state by relatively short time oxidation treatment (re-dispersion), and then the noble metal in the oxide state is reduced to a metal state by reduction treatment, whereby catalytic activity is regenerated.

In addition, a catalyst for purification of exhaust gas of the present invention more preferably satisfies Condition (II) below.

<Condition (II)>

The catalyst further comprises iron supported on the support, wherein an amount of the noble metal supported on the support ranges from 0.05% to 2% by mass to the mass of the catalyst, and a molar ratio (amount of iron/amount of noble metal) of an amount of the iron supported on the support to the amount of the noble metal ranges from 0.8 to 12 in terms of metal.

The present inventors have found that, when a catalyst for purification of exhaust gas of the present invention satisfies Condition (II), the grain growth of a noble metal can be surprisingly sufficiently inhibited over a long period of time to further sufficiently inhibit lowering of catalytic activity and also found that a catalyst can be efficiently re-produced by subjecting such a catalyst for purification of exhaust gas to oxidation and reduction treatments.

Additionally, in this case, the reason why the object is achieved is not still certain, but the present inventors speculate as follows. That is, in a catalyst for purification of exhaust gas satisfying Condition (II), a composite oxide (preferably a composite oxide in which the value of the binding energy of the oxygen is orbital indicates a value of 531 eV or less and the electron density of the oxygen is high) of zirconia and/or alumina and at least one element selected from the group consisting of the alkaline earth metal elements, rare earth elements and the 3A group elements-shows extremely strong interaction with the noble metal. In addition, iron (II) is supported on a support containing this composite oxide. Also, such iron makes an alloy with a noble metal in a reduction atmosphere and deposits on the surface and in the periphery of a noble metal as an oxide in an oxidation atmosphere. Therefore, supporting Fe in the support renders it possible to further sufficiently inhibit the grain growth of a noble metal in a variable atmosphere upon use of a catalyst, thereby being capable of further sufficiently inhibiting deterioration of catalytic activity. Additionally, in such catalyst for purification of exhaust gas, because Fe exists in the vicinity of the noble metal, the oxidation and reduction of a noble metal are made easy, thereby being capable of improving the activity of exhaust gas purification reaction. In particular, addition of Fe improves reducibility. Further, when a catalyst is regenerated by using the regeneration method in the case where a catalyst for purification of exhaust gas satisfying Condition (II) is used for a long period of time to grain-grow a noble metal, the particle diameter of the noble metal supported on the support can be rendered finer, and thus the catalytic activity can be regenerated easily and sufficiently.

Furthermore, a catalyst for purification of exhaust gas of the present invention more preferably satisfies Condition (III) below.

<Condition (III)>

The support is a support having a fluorite structure and containing a composite oxide of zirconium and at least one metal element including cerium and selected from the group consisting of rare earth elements and alkaline earth metal elements; wherein an amount of the metal element contained in the support ranges from 51 mol % to 75 mol % in terms of metal relative to the support; an amount of cerium contained in the metal element is in the range of 90 mol % or higher in terms of metal relative to the metal element; and an amount of the noble metal supported on 100 g of the support is twice or less a standard value X and ranges from 0.01 g to 0.8 g, the standard value X being calculated by Equation (1):

$$X=(\sigma/100)\times S/s \div N \times M_{nm} \times 100 \quad (1)$$

where X represents the standard value (unit: g) of the amount of the noble metal for 100 g of the support; σ represents a probability (unit: %) in which the metal element is surrounded by the metal element, the probability σ being calculated by Equation (2):

$$\sigma = M - 50 \quad (2)$$

where M represents the ratio (units: mol %) of the metal element contained in the support; S represents a specific surface area (units: m²/g) of the support; s represents a unit area (units: Å²/number) per one cation, the unit area s being calculated by Equation (3):

[Formula 1]

$$s = \{a^2 + (\sqrt{2})\times a^2 + (\sqrt{3}/2)\times a^2\}/3 \div 2 \quad (3)$$

where a represents a lattice constant (unit: Å); N represents Avogadro's number (6.02×10²³ (unit: number); and $M_{nm}$ represents the atomic weight of the noble metal supported on the support.

The present inventors have found that, when a catalyst for purification of exhaust gas of the present invention satisfies Condition (III), surprisingly, the grain growth of a noble metal can be sufficiently inhibited even if the catalyst is exposed to high-temperature exhaust gas over a long period of time to further sufficiently inhibit deterioration of catalytic activity and also found that the catalytic activity can be easily regenerated by re-dispersion of a noble metal even when the noble metal is subjected to grain growth, that catalytic activity per amount of a supported noble metal can be sufficiently high and that the catalyst can exhibit excellent catalytic activity.

In addition, in this case, why the above object is achieved is not yet known exactly, but the present inventors speculate as follows. That is, in a catalyst for purification of exhaust gas satisfying Condition (III) a composite oxide of zirconium and at least one element selected from the group consisting of rare earth elements and alkaline earth metal elements, containing cerium, indicates extremely strong interaction with a noble metal. This is attributed to binding of a noble metal with cerium (Ce) or a rare earth element and an alkaline earth metal element via oxygen in an oxidation atmosphere. Therefore, the grain growth of a noble metal can be sufficiently inhibited even if the catalyst is exposed to high temperature exhaust gas for a long time, thereby sufficiently restraining deterioration of the catalytic activity.

Additionally, in a catalyst for purification of exhaust gas satisfying Condition (III), the support comprises a fluorite structure and the ratio of cerium within a metal element is in the range as described above, and therefore a decrease in the specific surface area is sufficiently inhibited even in a high temperature atmosphere since cerium exists in a support in a solid-dissolved state and the number of sites capable of holding a noble metal per amount of the support becomes sufficient, whereby the grain growth of the noble metal is sufficiently restrained, thereby being capable of inhibiting deterioration of catalytic activity. Moreover, because the amount of a noble metal is in the range meeting the above mentioned conditions, grain growth attributable to an extra amount of noble metal is inhibited.

Moreover, when a catalyst for purification of exhaust gas satisfying Condition (III) is used for a long period of time to grow grains, heating the catalyst in an oxidation atmosphere containing oxygen (preferably heating at 500° C. to 1000° C.) causes a noble metal to form a composite oxide and a metal oxide with the support, so that the noble metal is gradually dispersed in a state spread on the support surface. As a result, the noble metal on the support becomes a highly dispersed and supported state in an oxide state (re-dispersion), and then the noble metal in the oxide state is reduced to a metal state by reduction treatment, whereby catalytic activity is regenerated.

A regeneration method for a catalyst for purification of exhaust gas of the present invention is a method of applying oxidation treatment of heating in an oxidation atmosphere containing oxygen and reduction treatment to the catalyst for purification of exhaust gas of the present invention.

In the regeneration method for a catalyst for purification of exhaust gas of the present invention, (i) the temperature in the oxidation treatment is preferably from 500° C. to 1000° C., and/or (ii) the oxygen concentration in the oxidation atmosphere is preferably 1% by volume or higher.

In addition, in the regeneration method for a catalyst for purification of exhaust gas of the present invention, the oxidation treatment and the reduction treatment can be applied to the catalyst for purification of exhaust gas to in a state in which the catalyst is installed in the exhaust system of an internal combustion engine.

Moreover, the regeneration method for a catalyst for purification of exhaust gas of the present invention preferably comprises (iii) a step of mounting a temperature sensor on the catalyst for purification of exhaust gas and then determining the extent of deterioration of the catalyst for purification of exhaust gas on the basis of an operation time and a temperature detected by the temperature sensor; and a step of initiating the regeneration processing after the catalyst is determined to be in a deterioration state, and/or comprises (iv) a step of determining a deterioration state of the catalyst for purification of exhaust gas by using a catalyst deterioration diagnosing device for determining the deterioration state of the catalyst for purification of exhaust gas and a step of initiating the regeneration processing after the catalyst is determined to be in a deterioration state.

A first apparatus for purification of exhaust gas of the present invention comprises, an exhaust gas feeding tube, a catalyst for purification of exhaust gas of the present invention placed inside the exhaust gas feeding tube, a temperature sensor mounted on the catalyst for purification of exhaust gas, and a control means for determining the extent of deterioration of the catalyst for purification of exhaust gas on the basis of an operation time and a temperature detected by the temperature sensor and, after the catalyst is determined to be in a deterioration state, controlling so as to initiate regeneration processing of applying oxidation treatment of heating in an oxidation atmosphere containing oxygen, and reduction treatment, after the catalyst is determined to be in a deterioration state.

In addition, a second apparatus for purification of exhaust gas of the present invention comprises, an exhaust gas feeding tube, the catalyst for purification of exhaust gas of the present invention, the catalyst being placed inside the exhaust gas feeding tube, a catalyst deterioration diagnosing device for determining the deterioration state of the catalyst for purification of exhaust gas, and a control means for controlling so as to initiate regeneration processing of applying, to the catalyst, oxidation treatment of heating t in an oxidation atmosphere containing oxygen, and reduction treatment, after the deterioration state of the catalyst for purification of exhaust gas is determined by means of the catalyst deterioration diagnosing device.

Moreover, a method for purification of exhaust gas of the present invention comprises purifying exhaust gas by bringing the exhaust gas into contact with a catalyst for purification of exhaust gas of the present invention.

According to the present invention, it is possible to provide a catalyst for purification of exhaust gas that can sufficiently inhibit aggregation of noble metal particles to sufficiently inhibit grain growth of the noble metal even if exposed to high temperature exhaust gas for a long period of time, thereby being capable of sufficiently inhibiting lowering of catalytic activity and can re-disperse the noble metal particles in a short time to readily regenerate catalytic activity when subjected to grain growth upon use even if the noble metal particles are in a relatively low temperature region, as well as is capable of easily regenerating itself albeit in a state in which the catalyst is installed in an exhaust system of an internal combustion engine and a method for regenerating the catalyst for purification of exhaust gas, and an apparatus for purification of exhaust gas and a method for purification of exhaust gas using the catalyst for purification of exhaust gas.

DETAILED DESCRIPTION OF THE PREFERRED EMBODIMENTS

Figure 1:
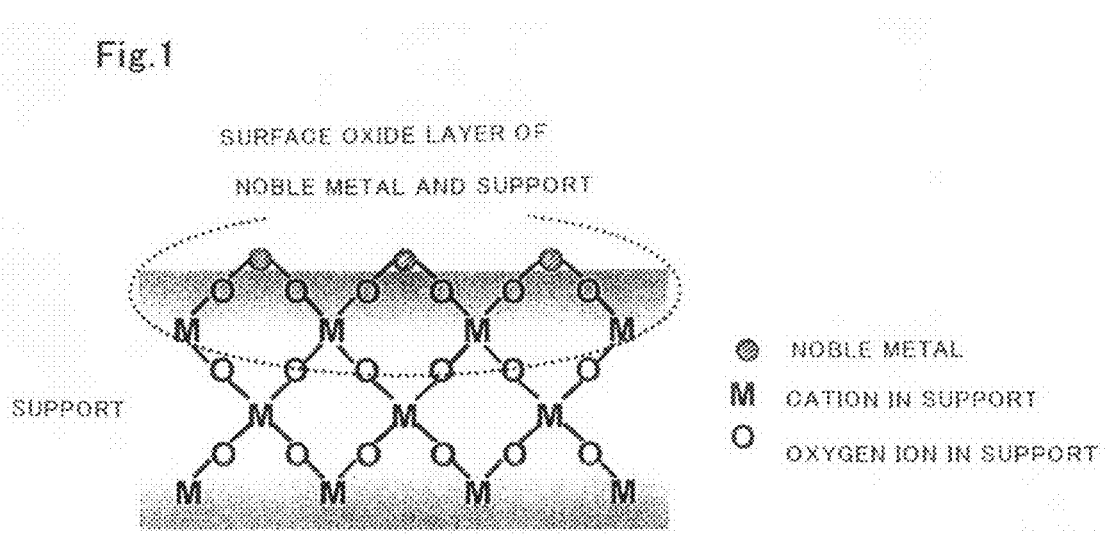
FIG. 1 is a schematic diagram indicating a state of a surface oxide layer in which a noble metal binds a cation of a support via an oxygen atom of the surface of the support.

Hereinafter, the present invention will be described in detail according to the preferred embodiments.

Firstly, a catalyst for purification of exhaust gas of the present invention will be set forth. In other words, a catalyst for purification of exhaust gas of the present invention is a catalyst for purification of exhaust gas in which a noble metal is supported on a metal-oxide support, wherein in a oxidation atmosphere, the noble metal exists on the surface of the support in high oxidation state, and the noble metal binds with a cation of the support via an oxygen atom on the surface of the support to form a surface oxide layer, and in a reduction atmosphere, the noble metal exists on the surface of the support in a metal state, and an amount of noble metal exposed at the surface of the support, measured by CO chemisorption, is 10% or more in atomic ratio to a whole amount of the noble metal supported on the support.

In a metal-oxide support related to the present invention, the value of the binding energy of the oxygen is orbital within the metal-oxide support preferably indicates a value of 531 eV or smaller, particularly preferably indicates a value of from 531 eV to 529 eV. When an oxide with its binding energy over 531 eV is used, the interaction between a noble metal and a support become insufficiently strong and in an oxidation atmosphere a surface oxide layer of the noble metal and the support is likely to be inefficiently formed. Furthermore, even though oxidation and reduction treatments as described below are applied, a noble metal on a support tends to be insufficiently re-dispersed. On the other hand, when a composite oxide with its binding energy less than 529 eV, the interaction between the noble metal and the support becomes too strong, even if reduction treatment is applied during regeneration processing, the noble metal on the support tends to hardly return to an active state.

The metal-oxide supports satisfying such conditions include, for example, the following:

$CeO_2$—$ZrO_2$—$Y_2O_3$: 530.04 eV
$ZrO_2$—$La_2O_3$: 530.64 eV
$CeO_2$—$ZrO_2$: 530 eV
$CeO_2$—$ZrO_2$—$La_2O_3$—$Pr_2O_3$: 529.79 eV.

In addition, in a catalyst for purification of exhaust gas of the present invention, the electronegativity of at least one cation among cations in the metal-oxide support is preferably lower than the electronegativity of the cation of zirconium. When the electronegativities of the cations within the metal-oxide support are higher than that of the cation of zirconium, the interaction between the noble metal and the support become insufficiently strong, so that it is likely to be difficult to efficiently form the surface oxide layer of the noble metal and the support in an oxidation atmosphere, and further the noble metal on the support tends to insufficiently re-disperse even though oxidation and reduction treatments described below are applied thereto.

Additionally, such metal-oxide supports preferably include a composite oxide of zirconia and/or alumina and at least one element selected from the group consisting of alkaline earth metal elements, rare earth elements and the 3A group elements. These alkaline earth metal elements include magnesium (Mg), calcium (Ca), strontium (Sr), barium (Ba) and radium (Ra), and among these Mg, Ca and Ba are preferable from the viewpoint of tendencies of strong interaction and strong affinity between a noble metal and its oxide. In addition, the rare earth elements and the 3A group elements include scandium (Sc), yttrium (Y), lanthanum (La), cerium (Ce), praseodymium (Pr), neodymium (Nd), samarium (Sm), gadolinium (Ga), terbium (Tb), dysprosium (Dy), ytterbium (Yb), lutetium (Lu) and the like, and among these La, Ce, Nd, Pr, Y and Sc are preferable and La, Ce, Y and Nd are more preferable, from the viewpoint of tendencies of strong interaction and strong affinity between a noble metal and its oxide. Such low elecronegativity rare earth elements and alkaline earth metal elements have strong interaction with a noble metal and thus bind a noble metal via an oxygen atom in an oxidation atmosphere and inhibit transpiration and sintering of a noble metal, thereby sufficiently inhibiting deterioration of a noble metal serving as an active site.

In such composite oxides, above described zirconia and/or alumina and at least one element selected from the group consisting of alkaline earth metal elements, rare earth elements and 3A group elements need to form a composite oxide. In other words, in a state where zirconia and/or alumina and at least one element selected from the group consisting of alkaline earth metal elements, rare earth elements and 3A group elements simply coexist (e.g., where zirconia and/or alumina particles and particles of at least one oxide selected from the group consisting of the alkaline earth metal oxides, rare earth oxides and 3A group oxides uniformly disperse), a noble metal on a support can be insufficiently re-dispersed when regeneration processing is applied, whereby catalytic activity is insufficiently restored (regenerated).

The ratio (composition ratio) of zirconia and/or alumina to at least one element selected from the group consisting of the alkaline earth metal elements, rare earth elements and 3A group elements making up such composite oxides is not particularly limited and the proportion of zirconia and/or alumina within a composite oxide is preferably from 5% by mass to 90% by mass, more preferably from 10% by mass to 70% by mass. When the proportion of zirconia and/or alumina within a composite oxide is less than the above lower limit, the specific surface area becomes small, and thus not only the grain growth of noble metal particles cannot be sufficiently inhibited, but the noble metal particles on a support tends to be insufficiently small even if a regeneration method of the present invention described below is adopted or regeneration processing is applied. On the other hand, if the proportion exceeds the above upper limit, not only the interaction of a noble metal with a support is insufficient and the grain growth of the noble metal cannot be sufficiently inhibited, but the noble metal particles on the support tend to become insufficiently small.

Moreover, the metal-oxide supports may further include, in addition to the above described composite oxides, alumina, zeolite, zirconia and the like as other components. In this case, the proportion of the composite oxide in a metal-oxide support according to the present invention is preferably 50% by mass or higher.

The support according to the present invention particularly preferably includes a composite oxide of zirconium and at least one element selected from the group consisting of rare earth elements and alkaline earth metal elements, containing cerium and has a fluorite structure. Herein, a fluorite structure refers to one of the crystal structures of the $AX_2$ type compounds (A is a metal element and X is oxygen), a structure represented by fluorite, and has a structure of a face centered cubic lattice in which four chemical formulae are contained in a unit lattice.

In such a support, an amount of the metal element contained in a support is preferably in a range from 51 mol % to 75 mol % in terms of metal to the amount of the support. In addition, the amount of such a metal element is preferably in a range from 51.5 mol % to 70 mol %, more preferably in a range from 52 mol % to 65 mol %, particularly preferably in a range from 52.5 mol % to 65 mol %, in terms of metal, to the amount of the support. If the amount of such a metal element is below 51 mol %, the number of sites holding a noble metal of the support is decreased and therefore the noble metal cannot be effectively held and also the noble metal particles on the support tends to be insufficiently small even though a regeneration method of the present invention described below is adopted and regeneration processing is applied. On the other hand, if the amount of such a metal element exceeds 75 mol %, the proportion of zirconium within the composite oxide is likely to be small, whereby the specific surface area is likely to be difficult to hold, thereby being likely to be inferior in heat resistance.

Additionally, the amount of cerium contained in a metal element in such a support is 90 mol % or higher in terms of metal to the amount of the metal element. If the amount of this cerium is less than the 90 mol %, a metal element besides cerium cannot be solid-dissolved in a support, leading to tendency of a decrease in the specific surface area.

Furthermore, in such a support, zirconium and the metal element are solid-dissolved to form a uniform composition within a particle. In general, since $CeO_2$ in a support extremely decreases in its specific surface area during high temperature reduction, the heat resistance tends to be decreased if a composition distribution between zirconium and cerium exists in a support. However, since the composition within the support becomes uniform as described above, a decrease in the specific surface area can be inhibited. Because of this, such a support becomes more excellent in heat resistance.

Furthermore, the shape of a metal-oxide support according to the present invention is not particularly limited and a powder form is preferable because the specific surface area is increased to obtain higher catalytic activity. In the case where a metal-oxide support is a powder form, the granularity of the support (secondary particle diameter) is not particularly limited and preferably in a range from 5 μm to 200 μm. If the particle diameter is less than the lower limit, the micronization of a support becomes costly and also its handling is likely to be difficult. On the other hand, if the diameter exceeds the upper limit, it is likely to be difficult to stably form, on a substrate as described below, a coat layer of a catalyst for purification of exhaust gas of the present invention.

Further, the specific surface area of such a metal-oxide support is not particularly limited. In addition, such a specific surface area can be calculated by using a BET isothermal adsorption equation as a BET specific surface area from an adsorption isotherm.

Additionally, the specific surface area of such a support is preferably 1 $m^2/g$ or greater, more preferably 5 $m^2/g$ or greater, still more preferably 10 $m^2/g$ or greater, particularly preferably 15 m²/g or greater. If the specific surface area is less than the lower limit, it becomes difficult to support a suitable amount of a noble metal in order to exhibit sufficient catalytic activity. Moreover, so long as the heat resistance of a support can be secured, a larger specific surface area of the support is preferable, so that the upper limit of the specific surface area is not particularly limited. In addition, because it is one important element for a support not to cause a decrease in the specific surface area in an endurance atmosphere (high temperature atmosphere) for maintaining catalytic activity, a support, the specific surface area of which is decreased by addition of heat history in advance, can also be utilized as a support used for such a catalyst. Hence, a support related to the present invention in which the specific surface area is made to be below 80 m²/g, further below 60 m²/g, by addition of heat history in advance may also be utilized. Additionally, such a specific surface area can be calculated by using a BET isothermal adsorption equation as a BET specific surface area from an adsorption isotherm.

Furthermore, the method of producing the support according to the present invention is not particularly limited, and for example, a support can be obtained by a method as described below. In other words, from an aqueous solution containing a salt (e.g., nitrate salt) of various metals of becoming starting materials of the above described composite oxides and further a surfactant (e.g., nonionic surfactant), as required, a co-precipitate of the composite oxide is made to be formed in the presence of ammonia, and the resulting co-precipitate is filtrated and washed and then dried, and further calcined to thereby to obtain a support comprising the composite oxide.

In addition, in a catalyst for purification of exhaust gas of the present invention, a noble metal is supported on the support. Although such noble metals include platinum, rhodium, palladium, osmium, iridium, gold and the like, platinum, rhodium and palladium are preferable from the viewpoint of a resultant catalyst for purification of exhaust gas indicating higher catalytic activity, and platinum and palladium are preferable from the viewpoint of regeneration.

Additionally, a catalyst for purification of exhaust gas of the present invention, in an oxidation atmosphere, has the noble metal that exists on the surface of the support in a high oxidation state and also has a surface oxide layer formed by binding of the noble metal with a cation of the support via oxygen on the surface of the support. Because of this, in a catalyst for purification of exhaust gas of the present invention, because the noble metal serving as an active site of a catalyst exists in high dispersion on the surface of the support and supported on the surface of the support in a stable state, the catalyst can exhibit sufficiently high catalytic activity and also sufficiently inhibit the grain growth of a noble metal. In addition, a "high oxidation state" in the present invention refers to a state in which a noble metal has a valence higher than 0. Additionally, an "oxidation atmosphere" herein refers to a gas atmosphere in which the oxygen concentration is 0.5% by volume or higher. Furthermore, the oxidation state of a noble metal on the surface of a support and a state of binding with a support can be confirmed by adoption of TEM (transmission electron microscope) observation and XAFS (X-ray absorption fine structure) spectral analysis.

Moreover, in a catalyst for purification of exhaust gas of the present invention, in a reduction atmosphere, the amount of noble metal exposed to the surface of the support measured by CO chemisorption is 10% or more (more preferably 15%) in atomic ratio to a whole amount of the noble metal supported on the support. When the atomic ratio related to the amount of a noble metal present on the surface of such a support is below 10%, the dispersion state of the noble metal present on the support surface becomes insufficient to thereby decrease catalytic activity per amount of the noble metal as well as to tends to make it difficult to regenerate catalytic activity by regeneration processing. In addition, in the present invention, the method described in Japanese Unexamined Patent Application Publication No. 2004-340637 is adopted as such CO chemisorption. Additionally, a "reduction atmosphere" refers to a gaseous atmosphere in which the concentration of reductive gas is 0.1% by volume or higher.

In addition, in a catalyst for purification of exhaust gas of the present invention, the molar ratio of a cation to the noble metal (cation/noble metal) is preferably 1.5 or more, the cation being exposed at the surface of the support and having an electronegativity lower than the electronegativity of zirconium. If the molar ratio (cation/noble metal) of the cation to the noble metal is below the lower limit, a part of the noble metal tends to hardly undergo interaction with the support.

Additionally, in a catalyst for purification of exhaust gas of the present invention, an amount of the noble metal supported on the support preferably in a range from 0.05% by mass to 2% by mass (more preferably from 0.1% by mass to 0.5% by mass) to the mass of the catalyst. If the amount of the noble metal is less than the lower limit, catalytic activity obtained by the noble metal is likely to be insufficient. On the other hand, if the amount exceeds the upper limit, the cost is greatly increased and grain growth tends to readily occur.

Moreover, in the present invention, it is preferred that an amount of the noble metal supported on 100 g of the support is twice or less the standard value X described below and 0.01 g to 0.8 g (more preferably from 0.02 g to 0.5 g, still more preferably from 0.05 g to 0.3 g). If the amount of such a noble metal is less than the lower limit, catalytic activity obtained by the noble metal is likely to be insufficient. On the other hand, if the amount exceeds the upper limit, the cost is greatly increased and grain growth readily occurs, and catalytic activity per amount of the noble metal tends to decrease.

A method of calculating the standard value X is expressed by Equation (1):

$$X=(\sigma/100) \times S/s \div N \times M_{nm} \times 100 \tag{1}$$

where X represents the standard value (unit: g) of the amount of the noble metal for 100 g of the support; σ represents a probability (unit: %) in which the metal element is surrounded by the metal element, the probability σ being calculated by Equation (2):

$$\sigma = M - 50 \tag{2}$$

where M represents the ratio (units: mol %) of the metal element contained in the support; S represents a specific surface area (units: m²/g) of the support; s represents a unit area (units: Å²/number) per cation, the unit area being calculated by Equation (3):

[Formula 2]

$$s=\{a^2+(\sqrt{2})\times a^2+(\sqrt{3}/2)\times a^2\}/3 \div 2 \tag{3}$$

where a represents a lattice constant (unit: Å); N represents Avogadro's number ($6.02 \times 10^{23}$ (unit: number); and $M_{nm}$ represents the atomic weight of the noble metal supported on the support. Preferably, the amount of the noble metal supported on 100 g of the support is 0.01 g to 0.8 g and is twice or less the standard value X (more preferably 1.5 times, still more preferably once). In addition, when two or more kinds of noble metals are supported, the atomic weight $M_{nm}$ of the noble metals is defined as a value calculated by summing all the values calculated by multiplying the atomic weights of the respective noble metals by the proportions in a whole amount of respective noble metals.

This Equation (1) indicates a relation between the number of sites for stably holding a noble metal on a support, i.e., the standard value X of the noble metal, and the composition and specific surface area of the support. If the amount of a noble metal supported on the support exceeds twice the standard value X calculated by Equation (1) above, the number of the noble metal atoms to be supported is larger than the number of sites for supporting the noble metal, whereby extra noble metal atoms are present, being likely to generate grain growth and decrease catalytic activity per amount of noble metal. However, when the amount of a noble metal supported on the support is twice or less the standard value X, the noble metal can be re-dispersed more easily and the catalytic activity per amount of the noble metal can be more efficiently regenerated, if the regeneration processing of the present invention described below is applied. If the amount of a noble metal supported on the support approaches the standard value X, the number of noble metal atoms suitably approaches the number of sites for supporting the noble metal of a support, further inhibiting grain growth to thereby tend to improve the regeneration. Furthermore, if the amount of a noble metal supported on the support becomes the standard value X or lower, the number of noble metal atoms can be already supported due to a larger number of sites for supporting the noble metal of a support, so that the noble metal can sufficiently bind the cation of the support surface via oxygen. Therefore, the noble metal is stably present on the surface of the support and also is held in a high dispersion state, so that the grain growth of the noble metal is further inhibited, whereby the catalytic activity per amount of the noble metal becomes more sufficient.

Figure 2:
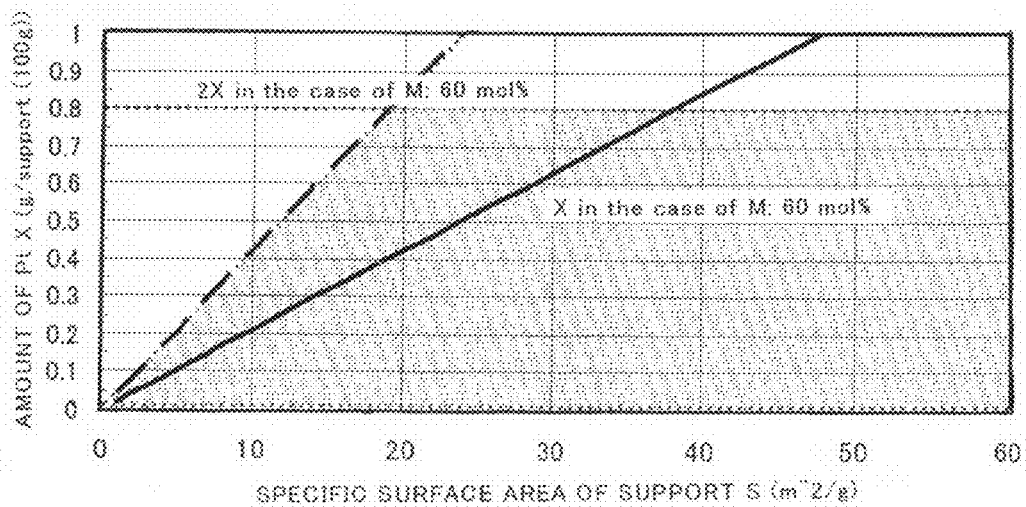
FIG. 2 shows a graph indicating the relationship between a specific surface area S of a support and a standard value X of an amount of a noble metal calculated by Equation (1) when $Ce_{0.6}Zr_{0.4}O_2$ (M=60 mol %, lattice constant a=5.304915 Å) is used as a support and Pt ($M_{nm}$=195.09) as a noble metal. In addition, the shadow part of FIG. 2 indicates twice or less the standard value X and a range of from 0.01 to 0.8 g.

FIG. 2 shows a graph indicating the relationship between the standard value X of the amount of a noble metal in Equation (1) above and the specific surface area S. In addition, this FIG. 2 shows a graph obtained by calculation when a $Ce_{0.6}Zr_{0.4}O_2$ support (M=60 mol %, lattice constant a=5.304915 Å) and Pt (atomic weight $M_{nm}$: 195.09) were used as examples.

Additionally, conditions in which the amount of a noble metal supported on 100 g of the support particularly even in after long term use is twice or less the standard value X calculated by Equation (1) above and in a range from 0.01 g to 0.8 g are preferably satisfied. For example, even after endurance testing of holding at a temperature of 1000° C. for 5 hours is carried out in a model gas atmosphere in which rich gas (CO (3.75% by volume)/$H_2$ (1.25% by volume)/$H_2O$ (3% by volume)/$N_2$ (balance)) and lean gas ($O_2$ (5% by volume)/$H_2O$ (3% by volume)/$N_2$ (balance)) are flowed 333 cc per minute for 1.5 g of catalyst in alternately every 5 minutes, the amount of a noble metal supported on 100 g of the support preferably satisfies the above conditions.

In addition, in a catalyst for purification of exhaust gas of the present invention, the noble metal is preferably supported on a support in a more grain-refined particle state. The particle diameter of such a noble metal is preferably 3 nm or less, more preferably 2 nm or less. When the particle diameter of the noble metal exceeds the upper limit, it is likely to be difficult to obtain high catalytic activity.

Additionally, the method of supporting the noble metal in the support is not particularly limited with the exception that the amount of a noble metal supported on the support is adjusted to satisfy each of the above conditions, and the following method can be adopted. For example, the method involves bringing the support into contact with an aqueous solution containing a salt (e.g., a dinitrodiamine salt) or a complex (e.g., a tetraammine complex) of a noble metal prepared such that the amount of the noble metal supported on the support satisfies each of the conditions described above and then drying and further calcining.

Moreover, in a catalyst for purification of exhaust gas of the present invention, in the support, further preferably supported is an addition component containing at least one element selected from the group consisting of alkaline earth metal elements, rare earth elements and 3A group elements. The basicity of a support is made improved by making such a support component supported on the support, whereby a stronger interaction can be imparted to between the support and a noble metal supported on its support. This makes it possible to more sufficiently inhibit the grain growth of a noble metal to be thereby able to sufficiently inhibit the deterioration of catalytic activity. In addition, an extremely strong interaction takes place between a support and a noble metal as described above by making such a support component supported on the support, tending to inhibit the grain growth of the noble metal. Even in the case of grain growth during use, regeneration processing is applied by the regeneration method of a catalyst for purification of exhaust gas of the present invention described below, whereby a noble metal can be more efficiently re-dispersed in a short time to regenerate catalytic activity.

Furthermore, the element contained in such a addition component is preferably at least one element selected from the group consisting of magnesium, calcium, neodymium, praseodymium, barium, lanthanum, cerium, yttrium and scandium, more preferably neodymium, barium, yttrium and scandium, from the viewpoints of being capable of improving the basicity of a support to more sufficiently inhibit the grain growth as well as more easily restoring the catalytic activity even in the case of a noble metal having grain-grown. In addition, the addition component is acceptable so long as it contains the above element. The examples include the above elements themselves, the oxides of the above elements, the salts of the above elements (carbonate salts, nitrate salts, citrate salts, acetate salts, sulfate salts), mixtures thereof, and the like.

Additionally, an amount of such addition component supported on the support is in a range from 0.5 to 20 (preferably from 1 to 10) relative to the amount of the noble metal in terms of metal in molar ratio (amount of addition component/amount of noble metal). If this molar ratio is less than the lower limit, the amount of the addition component is insufficient, and therefore the improvement of support basicity becomes difficult, being likely to decrease the effect of more sufficiently inhibiting the grain growth of the noble metal. On the other hand, if the molar ratio exceeds the upper limit, the specific surface area of a support is lowered, tending to lower the dispersibility of a noble metal.

In addition, in the amount of such an addition component supported on the support, the amount of the addition component per gram of the support is preferably from $1.28 \times 10^{-6}$ to $1.28 \times 10^{-3}$ mol, more preferably from $5.13 \times 10^{-6}$ to $5.13 \times 10^{-4}$ mol, still more preferably from $5.13 \times 10^{-6}$ to $2.56 \times 10^{-4}$ mol, particularly preferably from $5.13 \times 10^{-6}$ to $1.28 \times 10^{-4}$ mol.

Additionally, in such an addition component, the amount of the addition component supporting on the outer surface of the support is preferably certainly controlled in a small amount of the addition component, and further from the viewpoint of small amount of the addition component being preferable in cost, the addition component is preferably supported in a high density in the vicinity of the outer surface of the support. In such a state, when the support is in a powder form, it is preferable that 80% or higher of the addition component is supported in a region of 30% from the outer surface toward a center of the support in a region between the outer surface of the support and the center of the support.

Moreover, the method of supporting an addition component in the support is not particularly limited and, for example, a method of bringing the support into contact with an aqueous solution containing the element salt (e.g., carbonate salt, nitrate salt, acetate salt, citrate salt, sulfate salt) or a complex and then drying and further calcining can be adopted. In addition, after the support is heat treated as required and stabilized, the above addition material may be supported. Additionally, when such an addition component is supported, the order of supporting, in the support, the addition component and the noble metal is not particularly limited.

Furthermore, in a catalyst for purification of exhaust gas of the present invention, iron is further preferably supported on the support. Supporting Fe in this manner causes Fe to be alloyed with a noble metal in a reduction atmosphere. On the other hand, in an oxidation atmosphere, Fe deposits as an oxide on the surface and the vicinity of a noble metal, and therefore the grain growth of the noble metal can be further inhibited, whereby the decrease of catalytic activity can tend to be sufficiently inhibited. Furthermore, when regeneration processing that adopts the regeneration method for a catalyst for purification of exhaust gas of the present invention described below is applied, it tends to be possible to further micronize noble metal particles serving as an active site and sufficiently regenerate catalytic activity.

An amount of such iron supported on the support is preferably in a range from 0.5 to 12 (more preferably 0.8 to 12, still more preferably from 1 to 10, particularly preferably from 1 to 5) in molar ratio (mount of iron/amount of noble metal) to the amount of the noble metal in terms of metal. If such a molar ratio is less than the lower limit, the effect of inhibiting the grain growth of a noble metal is likely to be sufficiently obtained due to a small amount of iron. If the ratio exceeds the upper limit, excessively supported iron is likely to lower the specific surface area of the support, and further to lower the catalytic activity because the iron covers the surface of the noble metal after use of a long period of time. In addition, the upper limit value of the molar ratio is more preferably 3, particularly preferably 1.5, from the viewpoints of a decrease in the specific surface area of a support and the coverage of the noble metal surface.

Additionally, the lower limit of the amount of such iron supported on the support is preferably $1.28 \times 10^{-4}$ mol, more preferably $2.05 \times 10^{-4}$ mol, still more preferably $4.10 \times 10^{-4}$ mol, particularly preferably $5.13 \times 10^{-4}$ mol, for 100 g of the support. In addition, the upper limit of the amount of such iron supported on the support is preferably $1.23 \times 10^{-1}$ mol, more preferably $5.13 \times 10^{-2}$ mol, still more preferably $3.10 \times 10^{-2}$ mol, particularly preferably $1.28 \times 10^{-2}$ mol, for 100 g of the support.

Moreover, in a catalyst for purification of exhaust gas of the present invention, the supported state of the iron supported on the support is not particularly limited, and the iron is preferably supported closer to the noble metal. Making the iron supported closer to the noble metal leads to the tendency of more improvement of the effect of inhibiting noble metal grain growth and, when regeneration processing adopting the regeneration method for a catalyst for purification of exhaust gas of the present invention described below is applied, to the tendency of being capable of faster micronization (re-dispersion) of regeneration of catalytic activity serving as an activity site to regenerate the catalytic activity.

Furthermore, the method of supporting such iron is not particularly limited and, for example, a method of bringing the support into contact with an aqueous solution containing the element salt (e.g., carbonate salt, nitrate salt, acetate salt, citrate salt, sulfate salt) or a complex and then drying and further calcining can be adopted. In addition, supporting of such iron may be carried out at the same time with supporting of the noble metal, and, for example, adopt a method of bringing the support into contact with a mixture solution of an aqueous solution of a noble metal salt and an aqueous solution of an iron salt and then drying and further calcining can be adopted. In addition, the support is, as required, heat treated and stabilized and then the iron and noble metal and the like may be supported therein.

Like this, when a catalyst for purification of exhaust gas of the present invention comprises the support, a noble metal supported on the support and iron supported on the support, the supported state (structure of the catalyst) of the noble metal and the iron, supported on the support, is not particularly limited and the iron is preferably supported closer to the noble metal. Supporting of the iron closer to the noble metal leads to the tendency of improving the effect of inhibiting of the grain growth of a noble metal, whereby it tends to be possible to more micronize a noble metal serving as an active site when regeneration processing described below is applied.

In addition, the shape of a catalyst for purification of exhaust gas of the present invention is not particularly limited and shapes such as a honeycomb shape of a monolith catalyst and a pellet shape of a pellet catalyst can be adopted. The substrate used here is not particularly limited, is as appropriate selected according to applications of a resulting catalyst and the like, and a DPF substrate, a monolith substrate, a pellet substrate, planar substrate and the like are appropriately adopted. Additionally, the material properties are not particularly limited, substrates made of ceramics such as cordierite, silicon carbide and mullite and substrates made of metals such as stainless steel containing chromium and aluminum are suitably adopted. Moreover, the method of producing such a catalyst is not particularly limited and, for example, when a monolith catalyst is produced, a method is suitably adopted that involves forming a coat layer made of the support powder on a honeycomb-shaped substrate formed from cordierite or a metal foil and then supporting a noble metal therein. In addition, a monolith catalyst may be produced by a method of supporting a noble metal in the support powder in advance and then forming a coat layer on the substrate using its noble metal support powder.

Additionally, when a noble metal supported on a support is grain-grown due to use for a long period in such a catalyst for purification of exhaust gas of the present invention, application of the regeneration method of a catalyst for purification of exhaust gas of the present invention described below makes it possible to micronize (re-disperse) the noble metal particles to sufficiently regenerate the catalytic activity. In addition, the particle diameter of a noble metal supported on a support after application of such regeneration processing is preferably 3 nm or below (more preferably 2 nm or below), from the viewpoint of obtaining high catalytic activity.

So far, a catalyst for purification of exhaust gas of the present invention has been described; hereinafter, a regeneration method for a catalyst for purification of exhaust gas of the present invention will be set forth.

A regeneration method for a catalyst for purification of exhaust gas of the present invention is a method characterized by application of oxidation treatment of heating in an oxidation atmosphere containing oxygen and reduction treatment.

An oxidation atmosphere in which oxidation treatment according to the present invention is carried out renders it possible, so long as it contains small amount of oxygen, to oxidize a noble metal having a corresponding number of moles, and the concentration of oxygen is preferably 0.5% by volume or higher, more preferably from 1% to 20% by volume. If the concentration of oxygen is less than the lower limit, the re-dispersion of a noble metal on a support is likely to insufficiently proceed. On the other hand, the higher the concentration of oxygen, the better from the viewpoint of oxidation; however, a special device such as an oxygen cylinder is needed in order to make the oxygen concentration exceed 20% by volume that is a concentration of oxygen in air, whereby costs tends to increase. In addition, the gas except oxygen in an oxidation atmosphere related to the present invention preferably does not contain a reductive gas, and use of nitrogen gas or inert gas is preferable.

The heating temperature in oxidation treatment related to the present invention may be acceptable so long as the temperature is a temperature of oxidizing a supported noble metal, and the temperature is preferably in a range from 500° C. to 1000° C. If the oxidation treatment temperature is below 500° C., the speed in which a noble metal on a support is re-dispersed is likely to become extremely low thereby being likely to insufficiently proceed. On the other hand, if the temperature exceeds 1000° C., the support itself readily tends to cause thermal contraction, thereby decreasing catalytic activity.

In addition, the time needed for oxidation treatment related to the present invention is selected as appropriate according to oxidation treatment temperature or the like. If the temperature is low, a long time is needed; if the temperature is high, a short time may tend to be needed. If the oxidation treatment temperature is in a range from 500° C. to 1000° C., the time per step of oxidation treatment is preferably roughly from one second to one hour. If the oxidation treatment temperature is less than one second, re-dispersion of a noble metal on a support is likely to insufficiently proceed. On the other hand, if the temperature exceeds one hour, re-dispersion action of a noble metal tends to be saturated.

Oxidation treatment related to the present invention may be carried out within a predetermined treatment device by taking a catalyst for purification of exhaust gas out of an exhaust system, and is preferably executed in a state in which the catalyst is installed in an exhaust system of an internal combustion engine. This permits the number of oxidation treatment steps to be greatly reduced and also circulation of exhaust gas after oxidation treatment makes it possible to reduce an oxide of a noble metal. In this manner, when oxidation treatment is carried out in a state in which a catalyst for purification of exhaust gas is installed in an exhaust system, for example, a large amount of air is introduced from an air valve disposed in an upstream side of a catalyst, the air-fuel ratio (A/F) of an air fuel mixture is made high, or the amount of feeding of a fuel is greatly reduced on the contrary to thereby enlarge the air-fuel ratio (A/F) of an air fuel mixture and then the oxidation treatment can be implemented. In addition, as a heating means, a catalyst may be heated by a specific heating device or may be heated by using reaction heat on a catalyst.

As described above, if oxidation treatment is executed in a state in which a catalyst is installed in an exhaust system, oxidation treatment can also be conducted at a real time corresponding to the extent of deterioration of catalyst performance. For example, oxidation treatment may be periodically carried out according to the running time or travel distance of an automobile, or a $NO_x$ sensor or CO sensor is disposed in the downstream of a catalyst to detect catalyst performance and if its value exceeds a standard value, oxidation treatment may be carried out.

The reduction treatment related to the present invention can be carried out by heating the catalyst in an atmosphere in the presence of a reductive gas such as hydrogen or carbon monoxide. Hence, even though engine exhaust is in a stoichiometric atmosphere as a whole, a noble metal can be sufficiently subjected to reduction treatment because reductive gas is contained. Furthermore, in reduction treatment, if a reductive gas is contained albeit in a small amount, the condition is acceptable; however, the concentration of a reductive gas is preferably 0.1% by volume or larger. If the concentration of a reductive gas is less than the lower limit, a noble metal on a support tends to hardly return to an active state. In addition, the gas except a reductive gas in a reductive atmosphere related to the present invention preferably a gas not containing oxidative gas, and the use of nitrogen gas or inert gas is preferable.

Although the heating temperature in reduction treatment related to the present invention may be a temperature at which a metal oxide oxidized by the oxidation treatment, it is preferably 200° C. or higher and a temperature in a range from 400° C. to 1000° C. is preferable. If the reduction treatment temperature is less than 200° C., a noble metal oxide on a support is likely to be insufficiently reduced. On the other hand, if the temperature exceeds the upper limit, the thermal contraction of a support itself is likely to easily occur, whereby the catalytic activity tends to decrease.

In addition, the time needed for reduction treatment related to the present invention is selected as appropriate according to the reduction treatment and the like. If the temperature is low, a long time is needed; if the temperature is high, a short time tends to be acceptable. If the reduction treatment temperature is 200° C. or higher, the time per step of reduction treatment is preferably roughly from 2 seconds to 5 seconds. If the reduction treatment time is less than the lower limit, a noble metal oxide on a support is likely to be insufficiently reduced. On the other hand, if the time exceeds the upper limit, the reduction action of an oxide of a noble metal tends to be saturated.

The reduction treatment related to the present invention may also be carried out within a predetermined treatment device by taking a catalyst for purification of exhaust gas out of an exhaust system and is preferably performed in a state in which the catalyst is installed in the exhaust system of an internal combustion engine. This can greatly decrease the number of reduction treatment steps and also renders it possible to reduce an oxide of a noble metal by simply flowing exhaust gas after the oxidation treatment. When reduction treatment is carried out in this way in a state in which a catalyst for purification of exhaust gas is installed in an exhaust system, for example, in the case of a catalyst for purification of exhaust gas of an automobile, the treatment is preferably carried out by bringing a catalyst for purification of exhaust gas into contact with a stoichiometric atmosphere of a stoichiometrically equivalent ratio or in a rich atmosphere of lacking oxygen. This enables oxygen and reduction treatments to be applied while a catalyst for purification of exhaust gas is left to mount on an exhaust system and enables the regeneration processing of the present invention to be carried out as a part of air-fuel ratio control. In addition, as a heating means, a catalyst may be heated by a specified heating device or heated by using the heat of exhaust gas.

Additionally, although reduction treatment is carried out after oxidation treatment in the case where the oxidation treatment and the reduction treatment each have one step, the oxidation treatment and the reduction treatment may be alternately repeated in a regeneration method of the present invention and in this case the oxidation treatment may be prior to or after the reduction treatment. In addition, when the oxidation treatment and the reduction treatment are alternately repeated, the total time of the former treatment and the total time of the latter treatment are each particularly limited.

Moreover, a regeneration method for a catalyst for purification of exhaust gas of the present invention preferably includes a step (I) of mounting a temperature sensor on the catalyst for purification of exhaust gas and determining the extent of deterioration of the catalyst for purification of exhaust gas on the basis of an operation time and a temperature detected by the temperature sensor, and a step (II) of initiating the regeneration processing after the catalyst is determined to be in a deterioration state. Inclusion of such steps makes it possible to apply regeneration processing while checking the deterioration state of the catalyst for purification of exhaust gas, whereby the catalyst can be efficiently regenerated.

Moreover, such a regeneration method can suitably use a first apparatus for purification of exhaust gas of the present invention characterized by comprising an exhaust gas feeding tube, the catalyst for purification of exhaust gas of the present invention placed inside the exhaust gas feeding tube, a temperature sensor mounted on the catalyst for purification of exhaust gas, and a control means for determining the extent of deterioration of the catalyst for purification of exhaust gas on the basis of an operation time and a temperature detected by the temperature sensor and, after the judgment of the catalyst being in a deterioration state, controlling so as to initiate regeneration processing of subjecting the catalyst to oxidation treatment of heating in an oxidation atmosphere containing oxygen, and reduction treatment.

This temperature sensor is not particularly limited and, as appropriate, a well-known temperature sensor capable of detecting the temperature state of the catalyst for purification of exhaust gas can be employed. In addition, the control means include, for example, an engine control unit (ECU).

Additionally, the method of determining the extent of deterioration is not particularly limited and the following method can be adopted. For example, a method of constructing a map for the relationship between the operation time and the temperature until which regeneration processing is needed by measuring in advance the extent of the grain growth (extent of deterioration) of a noble metal supported on a catalyst by use of the relationship between the operation time and the temperature of the catalyst for purification of exhaust gas and then, on the basis of the map, determining to be deteriorated when the catalyst is utilized at a specific temperature for a specific time. Also, the extent of deterioration is determined and the regeneration processing is initiated after the catalyst is determined to be in a deterioration state.

Moreover, preferably, the step (II) of initiating the regeneration processing is controlled so as to initiate regeneration processing when the temperature of the catalyst for purification of exhaust gas is in a range from 500° C. to 1000° C., and then applies regeneration processing. In this manner, application of regeneration processing permits more efficient regeneration processing to be applied.

Furthermore, it is preferable that the regeneration method for a catalyst for purification of exhaust gas of the present invention determine the time needed for sufficiently regenerating the catalyst for purification of exhaust gas by application of the regeneration processing on the basis of the relationship between the extent of deterioration of the catalyst for purification of exhaust gas and the time of regeneration processing, and then controls the times of application of the oxidation and the reduction treatments. Application of regeneration processing in this manner makes it possible to decrease an unnecessary time and the like and to more efficiently regenerate a catalyst. In addition, upon such control, the above-described control means can be employed. Additionally, the method of determining the time needed for sufficiently regenerating the catalyst for purification of exhaust gas by application of the regeneration processing is not particularly limited and the examples include a method of measuring a time necessary for regeneration processing at a specified temperature in advance and constructing a map of the relationship between the time required for regeneration processing and the temperature at the time and subsequently determining a time needed for regeneration processing on the basis of the map.

In addition, the regeneration method for a catalyst for purification of exhaust gas of the present invention preferably includes a step of determining the deterioration state of the catalyst for purification of exhaust gas by means of a catalyst deterioration diagnosing device for determining the deterioration state of the catalyst for purification of exhaust gas, and a step of initiating the regeneration processing after the catalyst is in a deterioration state.

Additionally, the regeneration method for a catalyst for purification of exhaust gas of the present invention comprising such a step can suitably use a second apparatus for purification of exhaust gas of the present invention comprising an exhaust gas feeding tube, the catalyst for purification of exhaust gas described in any one of claims 1 to 7 placed inside the exhaust gas feeding tube, a catalyst deterioration diagnosing device for determining the deterioration state of the catalyst for purification of exhaust gas, and a control means for controlling so as to initiate regeneration processing of subjecting the catalyst to oxidation treatment of heating in an oxidation atmosphere containing oxygen, and reduction treatment, after the deterioration state of the catalyst for purification of exhaust gas is judged by means of the catalyst deterioration diagnosing device.

The regeneration method for a catalyst for purification of exhaust gas of the present invention comprising such steps can be carried out in the same manner as in the described regeneration method including the steps (I) and (II) except that a catalyst deterioration diagnosing device for determining the deterioration state of the catalyst for purification of exhaust gas is used in place of the step (I), and further the step of determining the deterioration state of the catalyst for purification of exhaust gas is adopted.

In addition, such catalyst deterioration diagnosing device is not particularly limited so long as the device can determine the deterioration state of the catalyst for purification of exhaust gas. The catalyst deterioration diagnosing device includes, for example, a catalyst deterioration diagnosing device described in Japanese Patent Application Publication No. 2005-180201. Additionally, the control means include, for example, an engine control unit (ECU).

Thus far, a regeneration method a catalyst for purification of exhaust gas of the present invention has been described. In the present invention, application of regeneration processing as described above makes it possible to micronize (re-disperse) grain grown noble metal particles to a diameter of 3 nm or less (more preferably 2 nm or less). Also, micronization to the particle diameter (re-dispersion) of noble metal particles supported on the support by application of regeneration processing enables catalytic activity to be more sufficiently regenerated.

The exhaust gas purification method of the present invention is a method characterized by purifying exhaust gas by bringing the exhaust gas into contact with the catalyst for purification of exhaust gas of the present invention. Such exhaust gas purification method is not particularly limited except that exhaust gas is brought into contact with the catalyst for purification of exhaust gas of the present invention by using the catalyst for purification of exhaust gas of the present invention. Furthermore, the method of bringing the exhaust gas into contact with the catalyst for purification of exhaust gas is not particularly limited, and a well-known method as appropriate can be adopted.

EXAMPLE

Hereinafter, the present invention will be set forth more concretely on the basis of Examples and Comparative Examples; however, the invention is by no means limited to the following Examples.

Example 1

To 2000 g of an aqueous mixture solution containing 242.6 g of an aqueous cerium nitrate solution (containing 28% by weight in terms of $CeO_2$), 157.6 g of an aqueous zirconium oxynitrate solution (containing 18% by weight in terms of $ZrO_2$), 12.6 g of yttrium nitrate and 10 g of a nonionic surfactant (available from Lion Corporation, trade name: Leocon), was added 142 g of aqueous ammonia of a concentration of 25% by weight and then the resulting material was agitated for 10 minutes at room temperature to obtain a coprecipitate. Next, the resulting coprecipitate was filtrated and washed and then dried at 110° C. and further calcined at 1000° C. for 5 hours in the atmosphere to obtain a support made of a cerium-zirconium-yttrium composite oxide ($CeO_2$—$ZrO_2$—$Y_2O_3$) The composition ratio of the resulting composite oxide was 55 mol % ($CeO_2$):40 mol % ($ZrO_2$):5 mol % ($Y_2O_3$). In addition, the value of the binding energy of the oxygen is orbital of the above composite oxide was obtained by XPS (X-ray photoelectron Spectroscopy), with the value listed in Table 4.

Next, 100 g of the support was immersed in a nitric acid aqueous solution of dinitrodiamineplatinum (platinum concentration: 4% by weight), filtrated and washed, and then dried at 110° C. and further calcined at 500° C. for 3 hours in the atmosphere to obtain a catalyst for purification of exhaust gas (Pt/$CeO_2$—$ZrO_2$—$Y_2O_3$) of the present invention. The amount of platinum supported on the support in the resulting catalyst was 1% by weight. In addition, shown in Table 1 is the molar ratio (Ms/PGM) of the mol of the cations the electronegativity of which is lower than that of zirconium of the composite oxide exposed to the surface of the support to the mol of platinum (PGM) in the resulting catalyst.

In addition, the value of such ratio (Ms/PGM) can be obtained as follows. In other words, first, for a ceria-based support, it is assumed that cations of $1.54 \times 10^{-5}$ mol for 1 $m^2$ of the specific surface area of a support are present on the outermost surface. Of these, if X % represents the proportion of cations the electronegativity of which is lower than that of zirconium, cations of $1.54 \times 10^{-5}$ mol×X/100 mol for 1 $m^2$ of the specific surface area of a support are present on the outermost surface of the support and also become the mol number of the cations (Ms) the electronegativity of which is lower than the electronegativity of zirconium. In addition, the mol number of a noble metal for 1 $m^2$ of the specific surface area of a support can be obtained by Equation below:

$$Y = W/(100 \times S \times M)$$

wherein Y represents the mol number of the noble metal, W represents the weight ratio of the noble metal to the support (units: % by weight), S represents the specific surface area (units: $m^2/g$) of the support, and M represents the atomic weight of the noble metal (units: g/mol). Therefore, the value of the ratio (Ms/PGM) can be evaluated by Equation below:

$$(Ms/PGM) = 1.54 \times 10^{-5} \times X \times S \times M/W.$$

Example 2

To 1500 g of an aqueous mixture solution containing 231 g of an aqueous zirconium oxynitrate solution (containing 18% by weight in terms of $ZrO_2$) and 63 g of lanthanum nitrate, was added 150 g of aqueous ammonia of a concentration of 25% by weight, and then the resulting material was agitated for 10 minutes at room temperature to obtain a coprecipitate. Next, the resulting coprecipitate was filtrated and washed and then dried at 110° C. and further calcined at 1000° C. for 5 hours in the atmosphere to obtain a support made of a zirconium-lanthanum composite oxide ($ZrO_2$—$La_2O_3$). The composition ratio of the resulting composite oxide was 65% by weight ($ZrO_2$):35% by weight ($La_2O_3$). In addition, the value of the binding energy of the oxygen is orbital of the composite oxide was obtained by XPS, with the value listed in Table 4. Additionally, a catalyst for purification of exhaust gas (Pt/$ZrO_2$—$La_2O_3$) of the present invention was obtained in the same manner as in Example 1 except that the support obtained in this manner was used. Moreover, the Ms/PGM value in the resultant catalyst is indicated in Table 1.

Example 3

100 g of a cerium-zirconium-yttrium composite oxide ($CeO_2$—$ZrO_2$—$Y_2O_3$, composition ratio: 55 mol % $CeO_2$:40 mol % $ZrO_2$:5 mol % $Y_2O_3$) obtained by adoption similar to the method of producing a support adopted in Example 1 was agitated in ion-exchanged water and thereto was added 3.38 g of barium nitrate to obtain a mixture solution. Next, the resulting mixture solution was heated, evaporation dried and further dried at 110° C. and then calcined at 500° C. for 5 hours in the atmosphere. Then, 100 g of the support was immersed in a nitric acid aqueous solution of dinitrodiamineplatinum (platinum concentration: 4% by weight), filtrated and washed, and then dried at 110° C. and further calcined at 500° C. for 3 hours in the atmosphere to obtain a catalyst for purification of exhaust gas (Pt/Ba/$CeO_2$—$ZrO_2$—$Y_2O_3$) of the present invention. In addition, the amount of platinum supported on the support in the resulting catalyst was 0.5 wt %, the Ba amount for 1 g of the support was 0.000128 mol, and the molar ratio of Ba to Pt (Ba/Pt) was 5. Additionally, the value of Ms/PGM in the resultant catalyst is shown in Tables 1 and 3.

Example 4

A catalyst for purification of exhaust gas of the present invention was obtained in the same manner as in Example 3 except that 5.62 g of neodymium nitrate hexahydrate was added instead of barium nitrate. In addition, the value of Ms/PGM in the resultant catalyst is shown in Table 3.

Example 5

A catalyst for purification of exhaust gas of the present invention was obtained in the same manner as in Example 3 except that a palladium nitrate aqueous solution (Pd concentration: 4% by weight) was used instead of the nitric acid aqueous solution of the dinitrodiamineplatinum (Pt concentration: 4% by weight). In addition, the value of Ms/PGM in the resultant catalyst is shown in Table 1 and 3.

Example 6

A catalyst for purification of exhaust gas of the present invention was obtained in the same manner as in Example 4 except that a palladium nitrate aqueous solution (Pd concentration: 4% by weight) was used instead of the nitric acid aqueous solution of the dinitrodiamineplatinum (Pt concentration: 4% by weight). In addition, the value of Ms/PGM in the resultant catalyst is shown in Table 3.

Example 7

A catalyst for purification of exhaust gas of the present invention was obtained in the same manner as in Example 3 except that a rhodium nitrate aqueous solution (Rh concentration: 4% by weight) was used instead of the nitric acid aqueous solution of the dinitrodiamineplatinum (Pt concentration: 4% by weight). In addition, the value of Ms/PGM in the resultant catalyst is shown in Table 1 and 3.

Example 8

A catalyst for purification of exhaust gas of the present invention was obtained in the same manner as in Example 4 except that a rhodium nitrate aqueous solution (Rh concentration: 4% by weight) was used instead of the nitric acid aqueous solution of the dinitrodiamineplatinum (Pt concentration: 4% by weight). In addition, the value of Ms/PGM in the resultant catalyst is shown in Table 3.

Comparative Example 1

A catalyst (Pt/Al$_2$O$_3$) was obtained in the same manner as in Example 1 for comparison except that a commercially available γ-Al$_2$O$_3$ powder (available from Grace Corp.) was used as a support. In addition, the value of Ms/PGM in the resultant catalyst is shown in Table 1 and 3.

Comparative Example 2

A catalyst (Pt/SiO$_2$) was obtained in the same manner as in Comparative Example 1 for comparison except that a commercially available SiO$_2$ powder (available from Aerosil Co. Ltd.) was used as a support.

Comparative Example 3

A catalyst for purification of exhaust gas was obtained in the same manner as in Comparative Example 1 for comparison except that a palladium nitrate aqueous solution (Pd concentration: 4% by weight) was used instead of the nitric acid aqueous solution of the dinitrodiamineplatinum (Pt concentration: 4% by weight). In addition, the value of Ms/PGM in the resultant catalyst is shown in Table 3.

Comparative Example 4

A catalyst for purification of exhaust gas was obtained in the same manner as in Comparative Example 1 for comparison except that a rhodium nitrate aqueous solution (Rh concentration: 4% by weight) was used instead of the nitric acid aqueous solution of the dinitrodiamineplatinum (Pt concentration: 4% by weight). In addition, the value of Ms/PGM in the resultant catalyst is shown in Table 3.

[Evaluation of Characteristics of the Catalysts for Purification of Exhaust Gas Obtained in Examples 1 to 3, 5 and 7 and Comparative Example 1]

<TEM Observation and XAFS Observations of Noble Metals>

Figure 3:
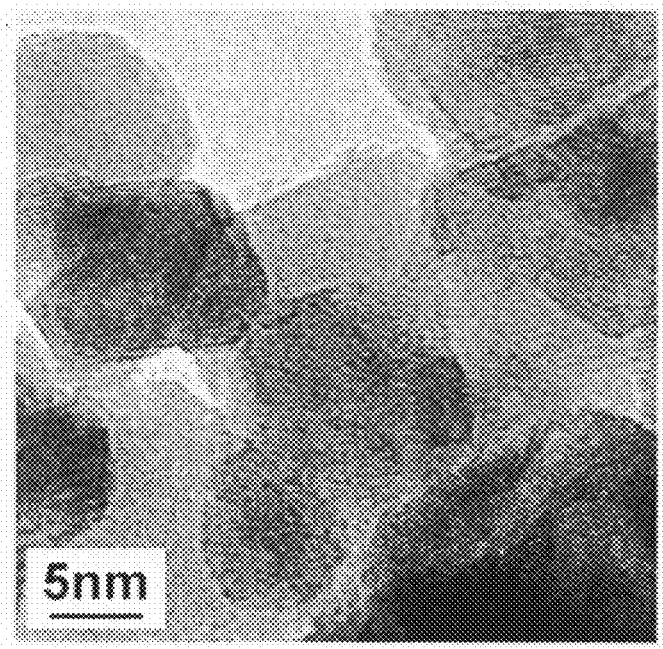
FIG. 3 shows a transmission electron microscope (TEM) photograph of the catalyst for purification of exhaust gas obtained in Example 1.
Figure 5:
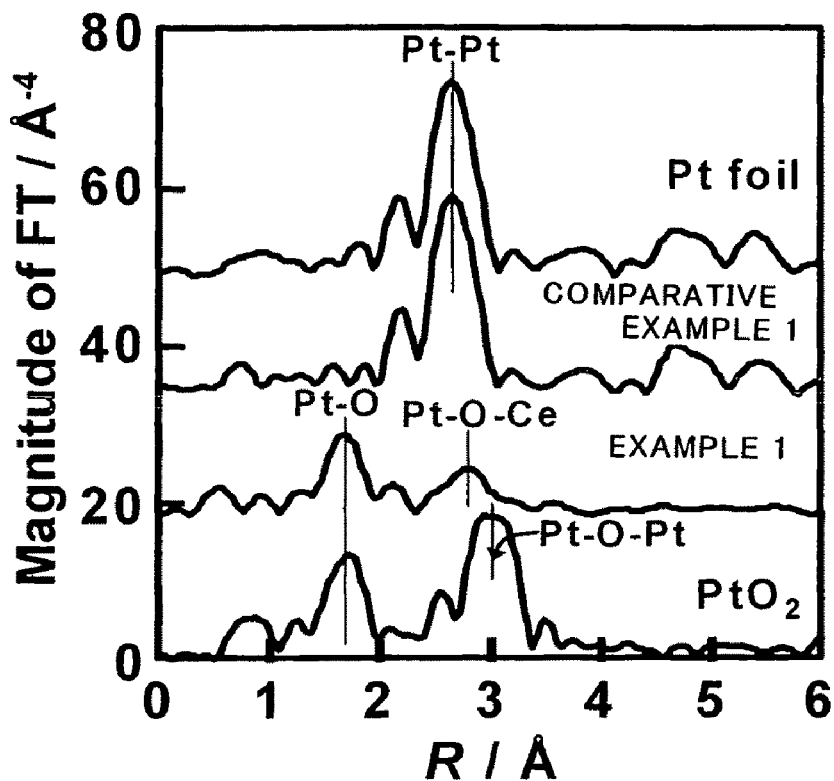
FIG. 5 shows a graph indicating spectra produced by Fourier transforming the Pt $L_3$-edge EXAFS spectra of catalysts for purification of exhaust gas obtained in Example 1 and Comparative Example 1, a Pt foil and a $PtO_2$ powder for reference purposes.
Figure 6:
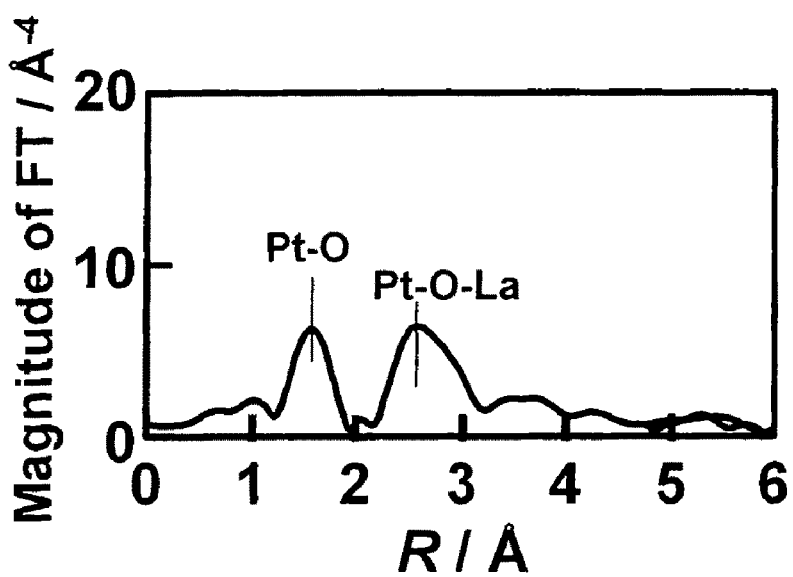
FIG. 6 shows a graph indicating a spectrum produced by Fourier transforming the EXAFS spectrum of catalysts for purification of exhaust gas obtained in Example 2.
Figure 7:
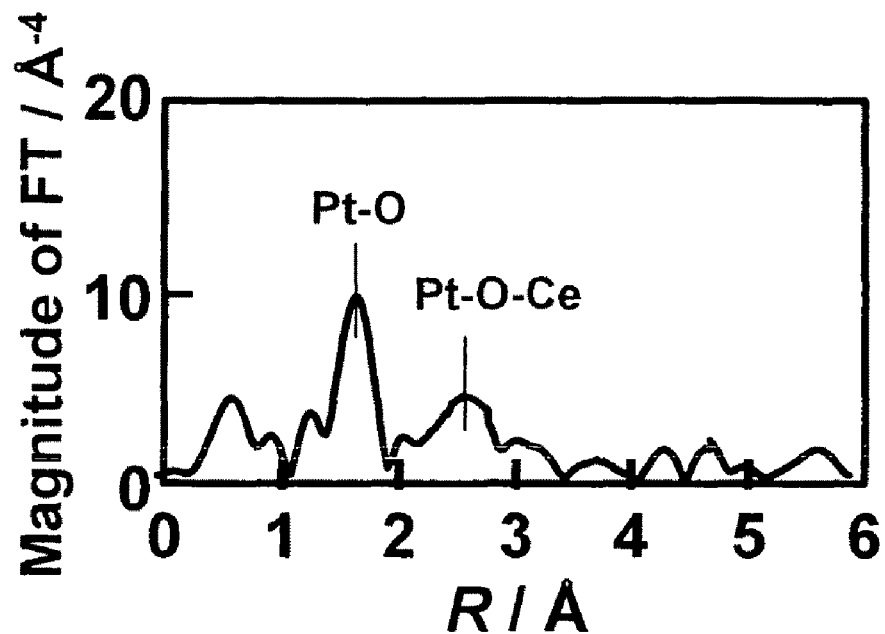
FIG. 7 shows a graph indicating a spectrum produced by Fourier transforming the EXAFS spectrum of catalysts for purification of exhaust gas obtained in Example 3.
Figure 8:
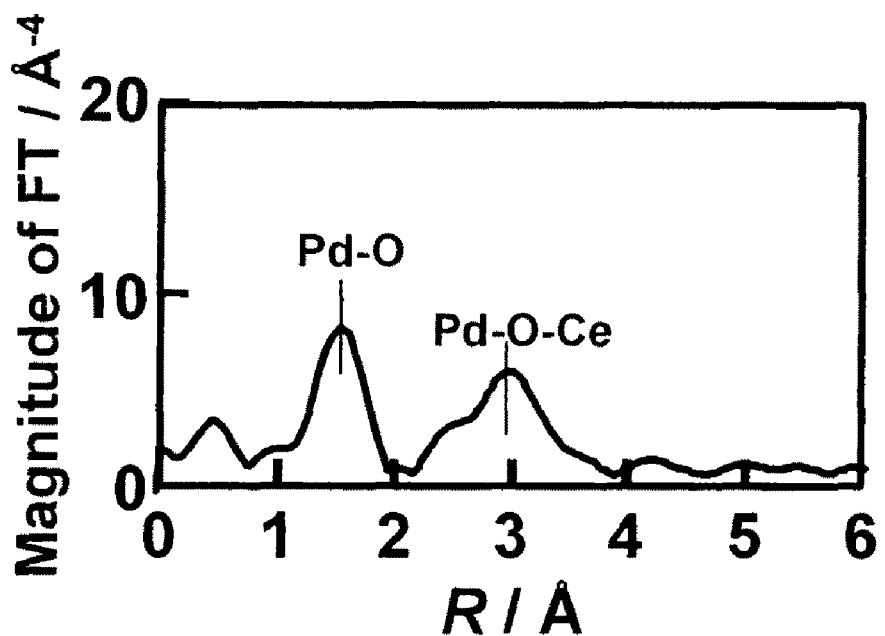
FIG. 8 shows a graph indicating a spectrum produced by Fourier transforming the EXAFS spectrum of catalysts for purification of exhaust gas obtained in Example 5.
Figure 9:
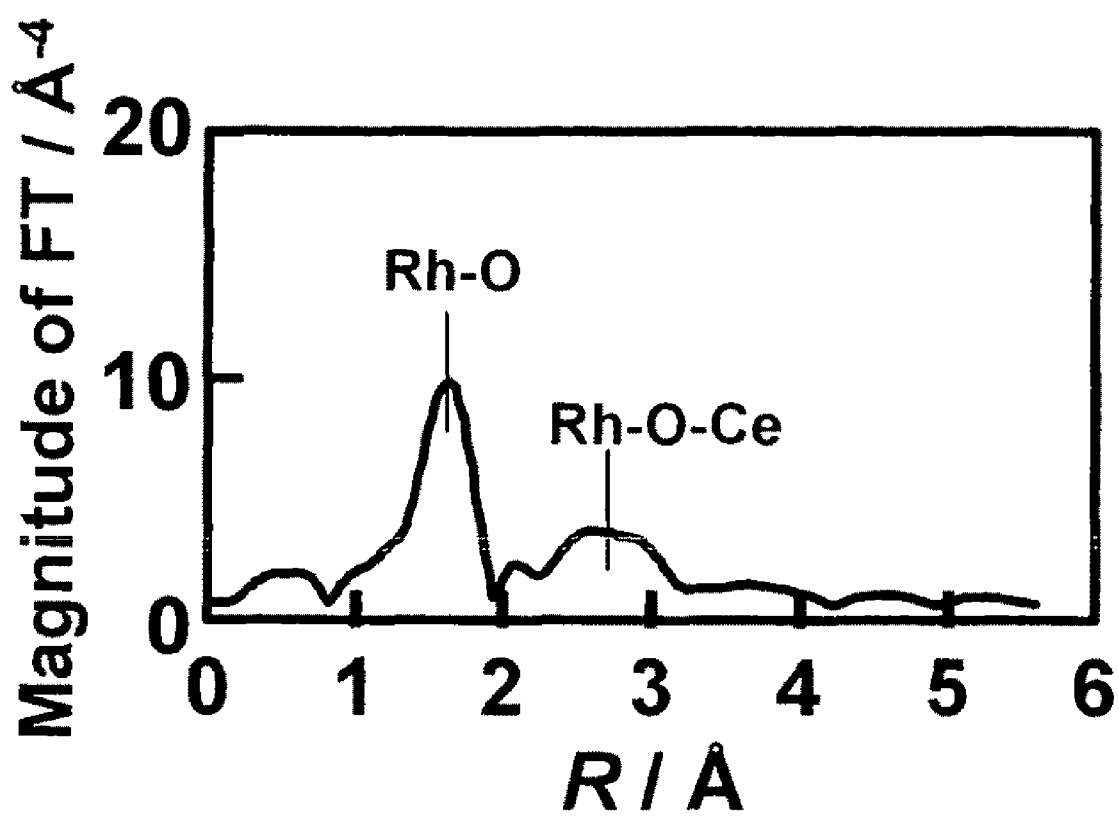
FIG. 9 shows a graph indicating a spectrum produced by Fourier transforming the EXAFS spectrum of catalysts for purification of exhaust gas obtained in Example 7.

First, the catalysts obtained in Examples 1 to 3 and Comparative Example 1 were each applied to oxidation treatment at 800° C. for 5 hours in an oxidation atmosphere including O$_2$ (20% by volume) and N$_2$ (80% by volume). In addition, the catalysts obtained in Examples 5 and 7 were each applied to oxidation treatment at 1000° C. for 5 hours in an oxidation atmosphere including O$_2$ (20% by volume) and N$_2$ (80% by volume). Then, each catalyst obtained in Example 1 and Comparative Example 1 after such oxidation treatment was observed under a TEM (Transmission Electron Microscopy). Moreover, with each catalyst obtained in Examples 1 to 3, 5 and 7 and Comparative Example 1 after such oxidation treatment, XAFS (X-ray Absorption Fine Structure) was observed for the noble metals (Pt, Pd, Rh), local structural analysis around a noble metal atom was performed, and the state of a noble metal on a support was observed. Resultant TEM photos are shown in FIG. 3 (Example 1) and FIG. 4 (Comparative Example 1), and results obtained by XAFS measurement are shown in FIG. 5 (Example 1 and Comparative Example 1), FIG. 6 (Example 2), FIG. 7 (Example 3), FIG. 8 (Example 5) and FIG. 9 (Example 7). Furthermore, shown in FIG. 5 are spectra produced by Fourier transformation of Pt L$_3$-edge EXAFS spectra of the catalysts obtained in Example 1 and Comparative Example 1, and a Pt foil and a PtO$_2$ powder.

<Dispersibility of Noble Metals after Reduction Treatment>

The catalysts obtained in Examples 1 to 3, 5 and 7 and Comparative Example 1 were applied to reduction treatment at 400° C. in a reduction atmosphere including H$_2$ (10% by volume) and N$_2$ (90% by volume) and then the dispersibilities of the noble metals were evaluated by a Co chemisorption method described in JP 2004-340637A. The results obtained are listed in Table 1. In addition, the larger the value of dispersibility (%), the higher the ratio of a noble metal exposed to the surface, indicating its presence in a high dispersive metal state.

TABLE 1

| Catalyst | | Binding energy of oxygen 1s orbital of support [eV] | Electronegativity of cation of support metal oxide | Ms/PGM | Dispersibility of noble metal by CO chemisorption method (%) | Surface oxide layer between noble metal and support |
|---|---|---|---|---|---|---|
| Example 1 | Pt/CeO$_2$—ZrO$_2$—Y$_2$O$_3$ | 530.04 | Ce: 1.12 Zr: 1.33 Y: 1.22 | 9.0 | 43 | Formed |
| Example 2 | Pt/ZrO$_2$—La$_2$O$_3$ | 530.64 | La: 1.10 Zr: 1.33 | 8.6 | 28 | Formed |

TABLE 1-continued

|  | Catalyst | Binding energy of oxygen 1s orbital of support [eV] | Electronegativity of cation of support metal oxide | Ms/PGM | Dispersibility of noble metal by CO chemisorption method (%) | Surface oxide layer between noble metal and support |
|---|---|---|---|---|---|---|
| Example 3 | Pt/Ba/CeO$_2$—ZrO$_2$—Y$_2$O$_3$ | 530.04 | Ce: 1.12<br>Zr: 1.33<br>Y: 1.22<br>Ba: 0.89 | 18 | 48 | Formed |
| Example 5 | Pd/Ba/CeO$_2$—ZrO$_2$—Y$_2$O$_3$ | 530.04 | Ce: 1.12<br>Zr: 1.33<br>Y: 1.22<br>Ba: 0.89 | 9.8 | 20 | Formed |
| Example 7 | Rh/Ba/CeO$_2$—ZrO$_2$—Y$_2$O$_3$ | 530.04 | Ce: 1.12<br>Zr: 1.33<br>Y: 1.22<br>Ba: 0.89 | 9.5 | 21 | Formed |
| Comparative Example 1 | Pt/γ-Al$_2$O$_3$ | 531.40 | Al: 1.61 | 0(*) | 2 | Unformed |

(*)in the table indicates that a cation the electronegativity of which is smaller than the electronegativity of zirconium is not present.

Figure 4:
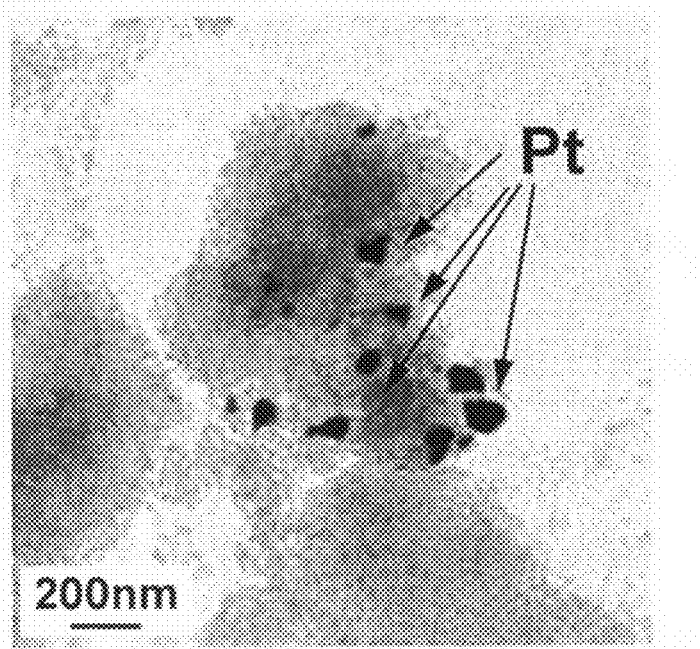
FIG. 4 shows a transmission electron microscope (TEM) photograph of the catalyst for purification of exhaust gas obtained in Comparative Example 1.

The results shown in FIGS. 3 and 4 indicate that Pt particles were not observed in a support by TEM measurement in a catalyst for purification of exhaust gas of the present invention (Example 1). In addition, in a catalyst for purification of exhaust gas of the present invention (Example 1), the presence of Pt was confirmed by analysis of EDX. Hence, in a catalyst for purification of exhaust gas of the present invention (Example 1), it has been ascertained that Pt is supported in a very high dispersive state. On the other hand, in a catalyst for purification of exhaust gas (Comparative Example 1) for comparison, Pt particles of from 3 nm to 150 nm were observed, and therefore it has been ascertained that Pt is supported in an aggregated state.

Additionally, because the result indicated in FIG. 5 shows that a peak attributable to the Pt—O bond is observed in a catalyst for purification of exhaust gas of the present invention (Example 1), it has been ascertained that Pt exists in a high oxidation state (+2 and +4 valance) Moreover, because a peak attributable to the Pt—O—Ce bond is observed in a catalyst for purification of exhaust gas (Example 1), it has been ascertained that Pt bonds with Ce of being a cation of a support via oxygen. Furthermore, the coordination number of the Pt—O—Ce bond was evaluated to be 3.5. This value is small as compared with the coordination number 12 when Pt is completely solid-dissolved in a support, and therefore it has been ascertained that Pt exists on the support surface and forms a surface oxide layer with the support. Similarly, as apparent from the results indicated in FIGS. 6 to 9, it has been ascertained that a noble metal is bonded with a cation of a support via oxygen also in a catalyst for purification of exhaust gas (Examples 2, 3, 5 and 7). Further, since the coordination number is small as compared with the coordination number when the noble metal is completely solid-dissolved, it has been ascertained that a noble metal forms a surface oxide layer with the support also in a catalyst obtained in Examples 2, 3, 5 and 7. On the other hand, because a large peak attributable to a Pt—Pt bond was observed in a catalyst for purification of exhaust gas for comparison (Comparative Example 1), it has been ascertained that Pt exists in large particles in a metal state. In addition, the coordination number of the Pt—Pt bond was evaluated to be 12, whereby it has been ascertained that the Pt exists in a bulk of a size of at least 20 nm.

Moreover, as apparent from the results indicated in Table 1, it has been ascertained that the value of dispersibility is low, at only 2% in a catalyst for purification of exhaust gas for comparison (Comparative Example 1), while it has been ascertained that the values of dispersibility in catalysts for purification of exhaust gas for comparison (Examples 1 to 3, 5 and 7) are as very high as 20% or larger, whereby it has been ascertained that a noble metal exists in high dispersion in a catalyst for purification of exhaust gas of the present invention.

From these results, it has been ascertained that a noble metal exists on the surface of a support, and is bonded with a cation of the composite oxide via oxygen exposed to the surface of the support to form a surface oxide layer of the noble metal and the support in a high oxidation state, and that the noble metal exists in a high dispersive metal state, in catalysts for purification of exhaust gas for comparison (Examples 1 to 3, 5 and 7).

[Evaluation of Characteristics of Catalysts for Purification of Exhaust Gas Obtained in Examples 3 to 8 and Comparative Examples 1, 3 and 4]

<Evaluation of Average Particle Diameters of Noble Metals after Endurance Testing>

Firstly, catalysts for purification of exhaust gas obtained in Examples 3 to 8 and Comparative Examples 1, 3 and 4 were each subjected to powder compacting molding at a pressure of 1 t/cm$^2$ by using a cold isostatical press method (CIP method) and then the resulting materials were ground to a size from 0.5 mm to 1 mm to produce pellet-shaped catalysts. Next, each pellet-shaped catalyst thus obtained was fed into a reaction vessel and processed at a temperature of 950° C. for 5 hours by alternately flowing rich and lean gases shown in Table 2 every 5 minutes such that the flow rate is 500 cc/min for 3 g of a catalyst in the reaction vessel to thereby grain-grow a noble metal on a support (endurance testing). The average particle diameters of noble metals after such endurance testing were evaluated, with the results obtained listed in Table 3. In addition, the average particle diameter of noble metal particles was evaluated by a CO chemisorption method described in JP 2004-340637 A.

TABLE 2

|  | CO | O$_2$ | CO$_2$ | N$_2$ |
|---|---|---|---|---|
| Rich gas [units: % by volume] | 5 | 0 | 10 | balance |
| Lean gas [units: % by volume] | 0 | 5 | 10 | balance |

TABLE 3

| | Catalyst | Binding energy of oxygen 1s orbital of support [eV] | Electronegativity of cation of support metal oxide | Ms/PGM | Noble metal particle diameter after endurance testing |
|---|---|---|---|---|---|
| Example 3 | Pt/Ba/CeO$_2$—ZrO$_2$—Y$_2$O$_3$ | 530.04 | Ce: 1.12<br>Zr: 1.33<br>Y: 1.22<br>Ba: 0.89 | 18.0 | 2.9 nm |
| Example 4 | Pt/Nd/CeO$_2$—ZrO$_2$—Y$_2$O$_3$ | 530.04 | Ce: 1.12<br>Zr: 1.33<br>Y: 1.22<br>Nd: 1.14 | 18.0 | 3.6 nm |
| Example 5 | Pd/Ba/CeO$_2$—ZrO$_2$—Y$_2$O$_3$ | 530.04 | Ce: 1.12<br>Zr: 1.33<br>Y: 1.22<br>Ba: 0.89 | 9.8 | 4.5 nm |
| Example 6 | Pd/Nd/CeO$_2$—ZrO$_2$—Y$_2$O$_3$ | 530.04 | Ce: 1.12<br>Zr: 1.33<br>Y: 1.22<br>Nd: 1.14 | 9.8 | 4.2 nm |
| Example 7 | Rh/Ba/CeO$_2$—ZrO$_2$—Y$_2$O$_3$ | 530.04 | Ce: 1.12<br>Zr: 1.33<br>Y: 1.22<br>Ba: 0.89 | 9.5 | 3.2 nm |
| Example 8 | Rh/Nd/CeO$_2$—ZrO$_2$—Y$_2$O$_3$ | 530.04 | Ce: 1.12<br>Zr: 1.33<br>Y: 1.22<br>Nd: 1.14 | 9.5 | 3.4 nm |
| Comparative Example 1 | Pt/γ-Al$_2$O$_3$ | 531.40 | Al: 1.61 | 0(*) | 42.2 nm |
| Comparative Example 3 | Pd/γ-Al$_2$O$_3$ | 531.40 | Al: 1.61 | 0(*) | 21.5 nm |
| Comparative Example 4 | Rh/γ-Al$_2$O$_3$ | 531.40 | Al: 1.61 | 0(*) | 8.2 nm |

(*)in the table indicates that a cation the electronegativity of which is smaller than the electronegativity of zirconium is not present.

As apparent also from the results listed in Table 3, it has been ascertained that the grain growth of a noble metal is more sufficiently inhibited in a catalyst for purification of exhaust gas of the present invention (Examples 3 to 8).

[Evaluation of Characteristics of Catalysts for Purification of Exhaust Gas Obtained in Examples 1 and 2 and Comparative Examples 1 and 2]

<Platinum Re-Dispersion Testing>

Test Example 1

The catalyst obtained in Example 1 was subjected to heat treatment at 1000° C. for 5 hours in an atmosphere including 3% by volume CO and 97% by volume N$_2$ to grain-grow platinum on a support. Then, the catalyst in which platinum was grain-grown in this manner was subjected to oxidation treatment (re-dispersion processing) at 800° C. for 30 minutes in an oxidation atmosphere including 20% by volume O$_2$ and 80% by volume N$_2$ to try to re-disperse the platinum. The average particle diameter of the platinum particles after endurance testing and the average particle diameter of the platinum particles after re-dispersion processing are evaluated, with the results obtained listed in Table 4. In addition, the average particle diameter of the platinum particles was evaluated by the CO chemisorption method described in JP 2004-340637 A. Additionally, this re-dispersion processing and the reduction pre-treatment by the CO chemisorption method have achieved the oxidation and reduction treatments of each catalyst for purification of exhaust gas, which have been regarded as regeneration processing.

Test Example 2

A platinum dispersion test was carried out in the same manner as in Test Example 1 except that the processing temperature in re-dispersion processing was set at 500° C. The result obtained is shown in Table 4.

Test Example 3

A platinum dispersion test was carried out in the same manner as in Test Example 1 except that the processing temperature in re-dispersion processing was set at 1000° C. The result obtained is shown in Table 4.

Test Example 4

A platinum dispersion test was carried out in the same manner as in Test Example 1 except that the processing temperature was set at 600° C. and the oxygen concentration is 3% in re-dispersion processing. The result obtained is shown in Table 4.

Test Example 5

A platinum dispersion test was carried out in the same manner as in Test Example 1 except that the catalyst obtained in Example 2 was used. The result obtained is shown in Table 4.

Comparative Test Example 1

Next, a platinum dispersion test was carried out in the same manner as in Test Example 1 except that the catalyst obtained in Comparative Example 1 was used and that platinum on a support was subjected to grain growth by using the catalyst obtained in Comparative Example 1 and heat-treating the platinum at 800° C. for 5 hours. The result obtained is shown in Table 4.

Comparative Test Example 2

A platinum dispersion test was carried out in the same manner as in Comparative Test Example 1 except that the processing temperature in re-dispersion processing was set at 500° C. The result obtained is shown in Table 4.

Comparative Test Example 3

A platinum dispersion test was carried out in the same manner as in Comparative Test Example 1 except that the catalyst obtained in Comparative Example 2 was used. The result obtained is shown in Table 4.

support until its average particle diameter becomes 6.7 nm (endurance testing). Next, the catalyst in which platinum was grain-grown in this manner was subjected to alternate repeat, over 0.100 minutes, of reduction treatment at 700° C. for 60 seconds in an atmosphere including 3% by volume $H_2$ and 97% by volume He and oxidation treatment (re-dispersion processing) at 700° C. for 10 seconds in an atmosphere including 20% by volume $O_2$ and 80% by volume He to try to re-disperse the platinum. Then, during its treatment, Pt L3-edge XANES (X-ray Absorption Near Edge Spectra) were measured every one second to estimate the average particle diameter of the platinum particles from the height of a peak called the white line of XANES spectra and examine

TABLE 4

| | Catalyst | Binding energy of oxygen 1s orbital of support [eV] | Pt average particle diameter after endurance testing [nm] | Pt average particle diameter after re-dispersion processing [nm] | Re-dispersion processing temperature [° C.] | Re-dispersion processing oxygen concentration [% by volume] |
|---|---|---|---|---|---|---|
| Test Example 1 | Pt/CeO$_2$—ZrO$_2$—Y$_2$O$_3$ (Example 1) | 530.04 | 13.6 | 3.3 | 800 | 20 |
| Test Example 2 | Pt/CeO$_2$—ZrO$_2$—Y$_2$O$_3$ (Example 1) | 530.04 | 13.6 | 10.2 | 500 | 20 |
| Test Example 3 | Pt/CeO$_2$—ZrO$_2$—Y$_2$O$_3$ (Example 1) | 530.04 | 13.6 | 4.6 | 1000 | 20 |
| Test Example 4 | Pt/CeO$_2$—ZrO$_2$—Y$_2$O$_3$ (Example 1) | 530.04 | 13.6 | 8.7 | 600 | 3 |
| Test Example 5 | Pt/ZrO$_2$—La$_2$O$_3$ (Example 2) | 530.64 | 14.2 | 3.8 | 800 | 20 |
| Comparative Test Example 1 | Pt/Al$_2$O$_3$ (Comparative Example 1) | 531.40 | 12.2 | 15.0 | 800 | 20 |
| Comparative Test Example 2 | Pt/Al$_2$O$_3$ (Comparative Example 1) | 531.40 | 12.2 | 12.8 | 500 | 20 |
| Comparative Test Example 3 | Pt/SiO$_2$ (Comparative Example 2) | 532.84 | 15.7 | 45.0 | 800 | 20 |

As apparent from the results indicated in Table 4, according to the regeneration method (Test Example 1 to 5) of the present invention, it has been ascertained that platinum particles produced by grain growth by endurance testing become very small in their average particle diameter by re-dispersion processing. On the other hand, it has been ascertained that the average particle diameter of platinum particles does not become small in Comparative Test Examples 1 to 3 even if re-dispersion processing is applied and that the average particle diameter rather becomes large by re-dispersion processing Comparative Test Examples 1 and 3. The inventors speculate that this is because the value of the binding energy of the oxygen is orbital in a support is larger than 531 eV and because an advantage by re-dispersion processing is not obtained due to weak interaction between the platinum and the support, on the contrary, and because the grain growth of the platinum is promoted due to a high-temperature oxidation atmosphere.

<Platinum Re-Dispersion Speed Testing>

Test Example 6

First, the catalyst obtained in Example 1 (Pt/CeO$_2$—ZrO$_2$—Y$_2$O$_3$) was subjected to heat treatment at 950° C. for 5 hours in an atmosphere including 3% by volume CO and 97% by volume N$_2$ to thereby grain-grow platinum on a changes in time lapse on the average particle diameter of the platinum particles during the treatment. The result obtained is indicated in Table 10.

Test Example 7

A platinum re-dispersion speed test was carried out in the same manner as in Test Example 6 except that the treatment temperature in which the above-described reduction treatment and oxidation treatment were alternately repeated was set at 600° C. The result obtained is indicated in Table 10.

Figure 10:
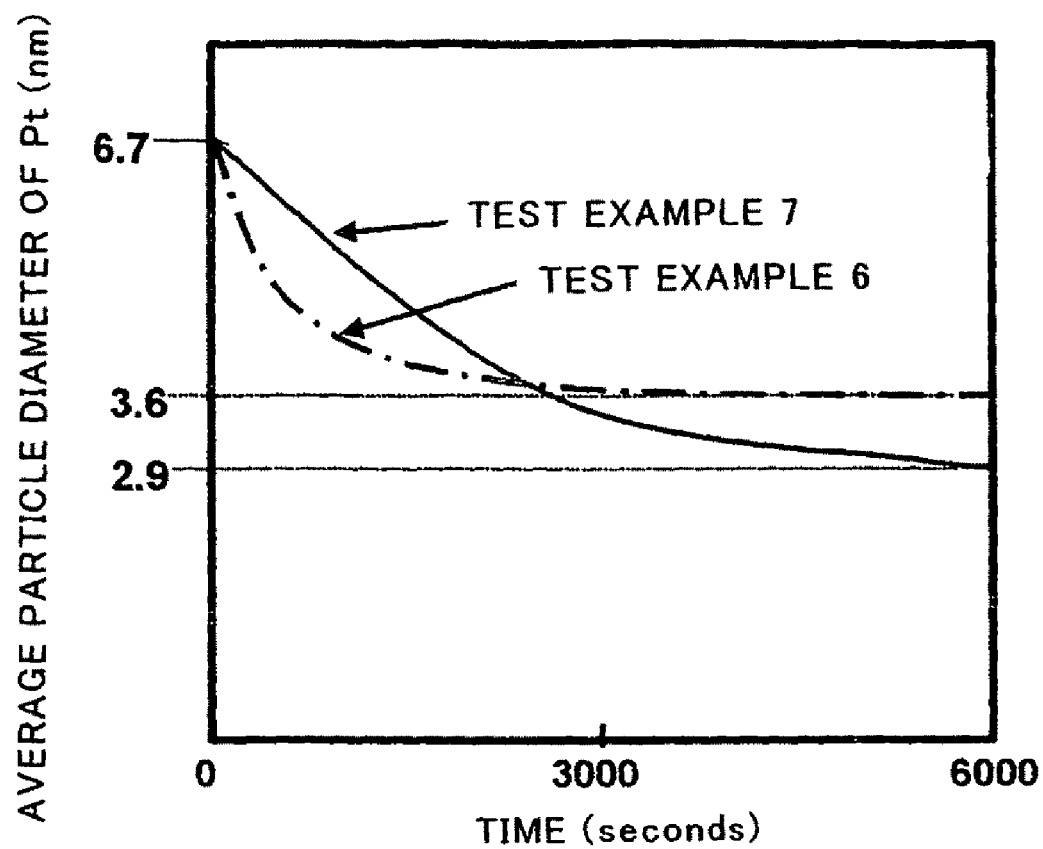
FIG. 10 shows a graph indicating results of platinum re-dispersion speed testing.

As apparent from the results indicated in FIG. 10, according to the regeneration method of the present invention (Test Examples 6 and 7), the re-dispersion of platinum proceeded by alternately repeating the above-described reduction treatment and oxidation treatment; the average particle diameter of platinum particles became small to 3.6 nm in Test Example 6 and to 2.9 nm in Test Example 7. In addition, the speed of platinum re-dispersion was high in the case where the treatment temperature was 700° C. as compared with the case where the treatment temperature was 600° C.

In this manner, even in as short as 10 seconds of re-dispersion processing, repeat of its re-dispersion processing renders small the average particle diameter of platinum particles, and thus regeneration processing of the present invention can be carried out as a part of air-fuel ratio control, thereby being capable of efficiently regenerating the catalyst in a state in which the catalyst is installed in the exhaust system of an external combustion engine. Hence, according to regeneration method of the present invention, it has been ascertained that high catalytic activity can be maintained for a long time without requiring special maintenance.

Example 9

To 2000 g of an aqueous mixture solution containing 233 g of an aqueous cerium nitrate solution (containing 28% by mass in terms of $CeO_2$), 152 g of an aqueous zirconium oxynitrate solution (containing 18% by mass in terms of $ZrO_2$), 14 g of yttrium nitrate and 10 g of a nonionic surfactant (available from Lion Corporation, trade name: Leocon), was added 200 g of aqueous ammonia of a concentration of 25% by mass, and then the resulting material was agitated for 10 minutes at room temperature to obtain a coprecipitate. Next, the resulting coprecipitate was filtrated and washed and then dried at 110° C. and further calcined at 1000° C. for 5 hours in the atmosphere to obtain a support made of a cerium-zirconium-yttrium composite oxide ($CeO_2$—$ZrO_2$—$Y_2O_3$). In addition, the composition ratio of the resulting composite oxide (CZY) was 68% by mass ($CeO_2$):28% by mass ($ZrO_2$):4% by mass ($Y_2O_3$). Moreover, the value of the binding energy of the oxygen is orbital of the above composite oxide was obtained by XPS (X-ray photoelectron Spectroscopy), with the value listed in Table 5.

Next, 100 g of the resultant support was immersed in ion exchanged water and agitated and thereto was added 3.38 g of barium nitrate to obtain a mixture solution. Then, the resultant mixture solution was heated and evaporation dried and then dried at a temperature of 110° C. and further calcined at 500° C. for 5 hours in the atmosphere and in the support was supported an addition component containing barium to obtain an addition component supported support.

Then, the resultant addition component support was immersed in an aqueous nitric acid solution of dinitrodiamineplatinum (platinum concentration: 4% by mass), filtrated and washed, and then dried at a temperature of 110° C. and further calcined at 500° C. for 3 hours in the atmosphere to obtain a powder catalyst for purification of exhaust gas, in which Pt and an addition component containing Ba in the support, of the present invention. The powder catalyst for purification of exhaust gas thus obtained of the present invention was subjected to powder compacting molding at a pressure of 1 t/cm$^2$ using the cold isostatical press method (CIP method) and then the resulting material was ground to a size from 0.5 mm to 1 mm to produce a pellet-shaped catalyst. In addition, the amount of Pt supported on the support in the resulting catalyst for purification of exhaust gas was 0.5% by mass, the amount of Ba supported on the support in the addition component was 0.000128 mol for 1 g of the support, and the molar ratio (Ba/Pt) of the amount of Ba of the addition component to the amount of Pt was 5.

Example 10

A pellet-shaped catalyst for purification of exhaust gas of the present invention was obtained in the same manner as in Example 9 except that 5.62 g of neodymium nitrate hexahydrate was added in place of barium nitrate. In addition, the amounts of supporting of Pt and Ba in the resulting catalyst for purification of exhaust gas are shown in Table 5.

Example 11

A pellet-shaped catalyst for purification of exhaust gas of the present invention was obtained in the same manner as in Example 9 except that the addition amount of barium nitrate was changed into 0.677 g. In addition, the amounts of supporting of Pt and Ba in the resulting catalyst for purification of exhaust gas are shown in Table 5.

Example 12

A pellet-shaped catalyst for purification of exhaust gas of the present invention was obtained in the same manner as in Example 9 except that the addition amount of barium nitrate was changed into 1.35 g. In addition, the amounts of supporting of Pt and Ba in the resulting catalyst for purification of exhaust gas are shown in Table 5.

Example 13

A pellet-shaped catalyst for purification of exhaust gas of the present invention was obtained in the same manner as in Example 9 except that the addition amount of barium nitrate was changed into 6.77 g. In addition, the amounts of supporting of Pt and Ba in the resulting catalyst for purification of exhaust gas are shown in Table 5.

Example 14

A pellet-shaped catalyst for purification of exhaust gas of the present invention was obtained in the same manner as in Example 9 except that the addition amount of barium nitrate was changed into 0.677 g and that 1.05 g of iron nitrate was further added into the mixture solution. In addition, the amounts of supporting of Pt, Ba and Fe in the resulting catalyst for purification of exhaust gas are shown in Table 5.

Example 15

A pellet-shaped catalyst for purification of exhaust gas of the present invention was obtained in the same manner as in Example 14 except that the addition amount of a nitric acid aqueous solution of dinitrodiamineplatinum was further added to the mixture solution of barium nitrate and iron nitrate to support Pt, Ba and Fe at the same time. In addition, the amounts of supporting of Pt, Ba and Fe in the resulting catalyst for purification of exhaust gas are shown in Table 5.

Example 16

A pellet-shaped catalyst for purification of exhaust gas of the present invention was obtained in the same manner as in Example 12 except that the condition of calcining temperature in obtaining the support changed from 1000° C. to 700° C. In addition, the amounts of supporting of Pt and Ba in the resulting catalyst for purification of exhaust gas are shown in Table 5.

Example 17

A catalyst for purification of exhaust gas for comparison was produced by using a support similar to that used in Example 9. In other words, 100 g of the support was immersed in a nitric acid aqueous solution of dinitrodiamineplatinum (platinum concentration: 4% by mass), filtrated and washed, and then dried at 110° C. and further calcined at a temperature of 500° C. for 3 hours in the atmosphere to obtain a powder catalyst for purification of exhaust gas, in which Pt was supported on the support, for comparison. The amount of platinum supported on the support in the resulting catalyst was 0.5% by mass. In addition, the catalyst for purification of exhaust gas thus obtained was subjected to powder compacting molding at a pressure of 1 t/cm² by using a cold isostatical press method (CIP method) and then the resulting material was ground to a size from 0.5 mm to 1 mm to produce a pellet-shaped catalyst. Additionally, the amount of platinum supported on the support in the resulting catalyst for purification of exhaust gas is shown in Table 5.

Comparative Example 5

A pellet-shaped catalyst for purification of exhaust gas of the present invention was obtained in the same manner as in Example 17 except that a commercially available γ-$Al_2O_3$ powder (available from Grace Corp.) was used as a support. In addition, the amount of Pt supported on the support in the resulting catalyst for purification of exhaust gas is shown in Table 5.

<Endurance Testing>

The pellet-shaped catalysts obtained in Examples 9 to 17 and Comparative Example 5 were each subjected to endurance testing. That is, the catalyst was fed into a reaction vessel and processed at a temperature of 950° C. for 5 hours by alternately flowing rich and lean gases shown in Table 2 every 5 minutes such that the flow rate was 500 cc/min for 3 g of the catalyst in the reaction vessel to thereby grain-grow a noble metal on a support (endurance testing). The average particle diameter of the noble metal after such endurance testing was evaluated, with the results obtained listed in Table 5. In addition, the average particle diameter of the noble metal was evaluated by the CO chemisorption method described in JP 2004-340637 A.

<Platinum Re-Dispersion Testing>

Each of the catalysts for purification of exhaust gas obtained in Examples 9 to 17 and Comparative Example 5 was subjected to oxidation treatment (re-dispersion processing) at 750° C. for 30 minutes in an atmosphere including 20% by volume-$O_2$ and 80% by volume $N_2$ to try to re-disperse platinum. The average particle diameters of the noble metal particles of the catalysts for purification of exhaust gas after such re-dispersion processing are each shown in Table 5. In addition, the average particle diameter of the noble metal was evaluated by the CO chemisorption method described in JP 2004-340637 A. This re-dispersion processing and the reduction pre-treatment by the CO chemisorption method have achieved the oxidation and reduction treatments of each catalyst for purification of exhaust gas, which have been regarded as regeneration processing.

TABLE 5

| | | Noble metal | | Addition element | | Addition component amount/noble metal amount (mol ratio: in terms of metal) | Noble metal particle diameter after endurance testing (nm) | Noble metal particle diameter after regeneration processing (nm) |
|---|---|---|---|---|---|---|---|---|
| | Support | Noble metal species | Supporting amount (mass %) | Element species | Addition amount (mol/support (1 g)) | | | |
| Example 9 | CZY | Pt | 0.5 | Ba | 0.000128 | 5 | 2.85 | 1.96 |
| Example 10 | CZY | Pt | 0.5 | Nd | 0.000128 | 5 | 3.61 | 1.65 |
| Example 11 | CZY | Pt | 0.5 | Ba | 0.0000256 | 1 | 2.31 | 1.76 |
| Example 12 | CZY | Pt | 0.5 | Ba | 0.0000513 | 2 | 1.93 | 1.74 |
| Example 13 | CZY | Pt | 0.5 | Ba | 0.000256 | 10 | 3.56 | 2.13 |
| Example 14 | CZY | Pt | 0.5 | Ba Fe | Each 0.0000256 | Each 1 | 2.02 | 1.83 |
| Example 15 | CZY | Pt (Ba and Fe simultaneously supported) | 0.5 | Ba Fe | Each 0.0000256 | Each 1 | 1.62 | 1.49 |
| Example 16 | CZY | Pt | 0.5 | Ba | 0.0000513 | 2 | 1.91 | 1.75 |
| Example 17 | CZY | Pt | 0.5 | — | — | — | 3.93 | 3.62 |
| Comparative Example 5 | $Al_2O_3$ | Pt | 0.5 | — | — | — | 9.79 | 10.1 |

As apparent from the results indicated in Table 5, in the catalysts for purification of exhaust gas of the present invention (Examples 9 to 17, particularly Examples 9 to 16), it has been ascertained that the grain growth of the noble metal is sufficiently inhibited. In addition, it has been ascertained that catalysts for purification of exhaust gas of the present invention (Examples 9 to 17, particularly Examples 9 to 16) are sufficiently micronized in their noble metal by the regeneration method of the present invention, which allows regeneration of the catalytic activity to be easily performed.

Example 18

To 2000 g of an aqueous mixture solution containing 242.6 g of an aqueous cerium nitrate solution (containing 28% by mass in terms of $CeO_2$), 157.6 g of an aqueous zirconium oxynitrate solution (containing 18% by mass in terms of $ZrO_2$), 12.6 g of yttrium nitrate and 10 g of a nonionic surfactant (available from Lion Corporation, trade name: Leocon), was added 142.2 g of aqueous ammonia of a concentration of 25% by mass, and then the resulting material was agitated for 10 minutes at room temperature to obtain a coprecipitate. Next, the resulting coprecipitate was filtrated and washed and then dried at 110° C. and further calcined at 1000° C. for 5 hours in the atmosphere to obtain a support made of a cerium-zirconium-yttrium composite oxide ($CeO_2$—$ZrO_2$—$Y_2O_3$) In addition, the composition ratio of the resulting composite oxide (CZY) was 67.9% by mass ($CeO_2$):28.4% by mass ($ZrO_2$):3.7% by mass ($Y_2O_3$).

Next, 100 g of the resulting support was immersed in ion exchanged water and agitated and thereto was added 2.092 g of iron nitrate to obtain a mixture solution. Then, the resultant mixture solution was heated and evaporation dried and then dried at a temperature of 110° C. and further calcined at 500° C. for 5 hours in the atmosphere and in the support iron was supported to obtain an addition component supported support.

Then, the resultant addition component support was immersed in an aqueous nitric acid solution of dinitrodiamineplatinum (platinum concentration: 4% by mass), filtrated and washed, and subsequently dried at a temperature of 110° C. and further calcined at 500° C. for 3 hours in the atmosphere to obtain a powder catalyst for purification of exhaust gas, in which Pt and Fe are supported in the support, of the present invention. The powder catalyst for purification of exhaust gas thus obtained of the present invention was subjected to powder compacting molding at a pressure of 1 t/cm² by using the cold isostatical press method (CIP method) and then the resulting material was ground to a size from 0.5 mm to 1 mm to produce a pellet-shaped catalyst. In addition, the amount of Pt supported on the support in the resulting catalyst for purification of exhaust gas was 1% by mass, the amount of Fe supported on the support was 0.00513 mol for 100 g of the support, and the molar ratio (Fe/Pt) of the amount of Fe to the amount of Pt was 1 in terms of metal.

Example 19

A pellet-shaped catalyst for purification of exhaust gas of the present invention was obtained in the same manner as in Example 1 except that the addition amount of iron nitrate was changed into 1.046 g and that the amount of Pt supported on the support was changed into 0.5% by mass. In addition, the amounts of supporting of Pt and Fe in the resulting catalyst for purification of exhaust gas and the molar ratio of Fe to Pt are shown in Table 8.

Example 20

A pellet-shaped catalyst for purification of exhaust gas of the present invention was obtained in the same manner as in Example 19 except that the addition amount of iron nitrate was changed into 2.092 g. In addition, the amounts of supporting of Pt and Fe in the resulting catalyst for purification of exhaust gas and the molar ratio of Fe to Pt are shown in Table 8.

Example 21

A pellet-shaped catalyst for purification of exhaust gas of the present invention was obtained in the same manner as in Example 19 except that the addition amount of iron nitrate was changed into 5.229 g. In addition, the amounts of supporting of Pt and Fe in the resulting catalyst for purification of exhaust gas and the molar ratio of Fe to Pt are shown in Table 8.

Example 22

A pellet-shaped catalyst for purification of exhaust gas, further having supported therein a supporting component containing a Ba element, of the present invention, was obtained in the same manner as in Example 19 except that the addition amount of iron nitrate was changed into 1.046 g and further 0.677 g of barium nitrate was added. In addition, the amounts of supporting of Pt, Fe and Ba in the resulting catalyst for purification of exhaust gas are shown in Table 8.

Example 23

A pellet-shaped catalyst for purification of exhaust gas, further having supported therein a supporting component containing a Ba element, of the present invention, was obtained in the same manner as in Example 22 except that, in addition to iron nitrate and barium nitrate, a nitric acid aqueous solution of dinitrodiamineplatinum is also added. In addition, the amounts of supporting of Pt, Fe and Ba in the resulting catalyst for purification of exhaust gas are shown in Table 8.

Example 24

A catalyst for purification of exhaust gas for comparison was produced by using the same support as that used in Example 18. In other words, 100 g of the support was immersed in an aqueous nitric acid solution of dinitrodiamineplatinum (platinum concentration: 4% by mass), filtrated and washed, and then dried at a temperature of 110° C. and further calcined at a temperature of 500° C. for 3 hours in the atmosphere to obtain a powder catalyst for purification of exhaust gas, in which platinum is supported on the support, for comparison. The amount of Pt supported on the support in the resulting catalyst was 1% by mass. In addition, the catalyst for purification of exhaust gas for comparison thus obtained was subjected to powder compacting molding at a pressure of 1 t/cm² by using a cold isostatical press method (CIP method) and then the resulting material was ground to a size from 0.5 mm to 1 mm to produce a pellet-shaped catalyst.

Example 25

A pellet-shaped catalyst for purification of exhaust gas of the present invention was obtained in the same manner as in Example 24 except that the amount of Pt supported on the support was changed into 0.5% by mass. In addition, the amount of Pt supported on the support in the catalyst for purification of exhaust gas is shown in Table 8.

Example 26

A pellet-shaped catalyst for purification of exhaust gas for comparison was obtained in the same manner as in Example 19 except that the addition amount of iron nitrate was changed into 0.523 g. In addition, the amounts of supporting of Pt and Fe in the resulting catalyst for purification of exhaust gas and the molar ratio of Fe to Pt are shown in Table 8.

Example 27

A pellet-shaped catalyst for purification of exhaust gas for comparison was obtained in the same manner as in Example 19 except that the addition amount of iron nitrate was changed into 15.69 g. In addition, the amounts of supporting of Pt and Fe in the resulting catalyst for purification of exhaust gas and the molar ratio of Fe to Pt are shown in Table 8.

<Endurance Testing (I)>

The pellet-shaped catalysts obtained in Examples 18 and 24 were each subjected to Endurance Testing (I). That is to say, the catalyst was treated at a temperature of 950° C. for 10 hours in a gas atmosphere including $H_2$ (3% by volume) and $N_2$ (97% by volume) to thereby grain-grow Pt on the support (Endurance Testing (I)). The average particle diameters of Pt after such endurance testing, with the results obtained shown in Tables 6 and 7. In addition, the average particle diameters of Pt were evaluated by the X-ray diffraction method (XRD) and the CO chemisorption method described in JP 2004-340637 A. The average particle diameters evaluated by the X-ray diffraction method are shown in Table 6 and the average particle diameters evaluated by the CO chemisorption method in Table 7.

TABLE 6

|  | Support | Noble metal | | Addition element | | Addition component amount/noble metal amount (mol ratio: in terms of metal) | Noble metal particle diameter after endurance testing (nm) |
|---|---|---|---|---|---|---|---|
|  |  | Noble metal species | Supporting amount (mass %) | Element species | Addition amount (mol/support (100 g)) | | |
| Example 18 | CZY | Pt | 1 | Fe | 0.00513 | 1 | 4.8 |
| Example 24 | CZY | Pt | 1 | no | 0 | 0 | 6.2 |

As apparent also from the results indicated in Table 6, it has been ascertained that if the grain growth is inhibited by the presence of Fe in the vicinity of Pt even in a simple rich atmosphere. Furthermore, in the catalyst obtained in Example 18, the Pt (1,1,1) diffraction line was shifted to the wide angle and Fe was solid-dissolved in Pt and alloyed.

<Regeneration Testing (I)>

Each of the catalysts for purification of exhaust gas of Examples 18 and 24 after Endurance Testing (I) was subjected to oxidation treatment (re-dispersion processing) at 800° C. for one minute in an atmosphere including 20% by volume $O_2$ and 80% by volume He to try to re-disperse the Pt. The average particle diameters of the catalysts for purification of exhaust gas after such re-dispersion processing are each indicated in Table 7. In addition, the average particle diameter was evaluated by the CO chemisorption method described in JP 2004-340637 A. Such re-dispersion processing and the reduction pre-treatment by the CO chemisorption method have achieved the oxidation and reduction treatments of each catalyst for purification of exhaust gas, which have been regarded as regeneration processing.

than the catalyst of Example 24 and this is because iron oxide is deposited from active alloyed sites and thus the Pt surface appears to thereby increase the amount of adsorption of CO. From these results, it has been ascertained that, in the catalyst obtained in Example 18, the grain growth of Pt is inhibited in the rich atmosphere and that active sites are regenerated further by regeneration processing.

<Endurance Testing (II)>

The pellet-shaped catalysts obtained in Examples 19 to 23 and 25 to 27 were each subjected to Endurance Testing. In other words, a catalyst was fed into a reaction vessel and processed at a temperature of 950° C. for 5 hours by alternately flowing rich and lean gases shown in Table 2 every 5 minutes such that the flow rate for 3 g of a catalyst was 500 cc/min to thereby grain-grow a noble metal on the support (Endurance Testing (II)). The average particle diameters of Pt after such endurance testing were evaluated by the CO chemisorption method described in JP 2004-340637 A, with the obtained results shown in Table 8.

<Regeneration Testing (II)>

Each of the catalysts for purification of exhaust gas of Examples 19 to 23 and 25 to 27 after Endurance Testing (II)

TABLE 7

|  | Support | Noble metal | | Addition element | | Addition component amount/noble metal amount (mol ratio: in terms of metal) | Noble metal particle diameter after endurance testing (nm) | Noble metal particle diameter after regeneration processing (nm) |
|---|---|---|---|---|---|---|---|---|
|  |  | Noble metal species | Supporting amount (mass %) | Element species | Addition amount (mol/support (100 g)) | | | |
| Example 18 | CZY | Pt | 1 | Fe | 0.00513 | 1 | 74.2 | 3.8 |
| Example 24 | CZY | Pt | 1 | no | 0 | 0 | 25.6 | 4.6 |

As shown in Table 7, after endurance testing in a rich atmosphere, the Pt particle diameter of the catalyst for purification of exhaust gas obtained in Example 18 was estimated to be larger than the Pt particle diameter of the catalyst obtained in Example 24. These results, as apparent from the Pt particle diameter indicated in Table 6 being a one-digit number, suggest that CO cannot be affixed to the outermost surface of an active site by causing Fe to be solid-dissolved and alloyed with Pt, which may be affected by the measurement method (CO chemisorption method). Because of this, the Pt particle diameters indicated in Table 7 are not actual diameters. In addition, after regeneration processing, the catalyst of Example 18 is smaller in its Pt particle diameter was subjected to oxidation treatment (re-dispersion processing) at 750° C. for 30 minutes in an atmosphere including 20% by volume $O_2$ and 80% by volume $N_2$ to try to re-disperse the Pt. The average particle diameters of the catalysts for purification of exhaust gas after such re-dispersion processing are each indicated in Table 8. In addition, the average particle diameter was evaluated by the CO chemisorption method described in JP 2004-340637 A. Such re-dispersion processing and the reduction pre-treatment by the CO chemisorption method have achieved the oxidation and reduction treatments of each catalyst for purification of exhaust gas, which have been regarded as regeneration processing.

TABLE 8

| | Support | Noble metal | | Addition element | | Addition component | Noble metal particle diameter after | Noble metal particle diameter after | Specific surface area after |
|---|---|---|---|---|---|---|---|---|---|
| | | Noble metal species | Supporting amount (mass %) | Element species | Addition amount (mol/ support (100 g)) | amount/noble metal amount (mol ratio: in terms of metal) | endurance testing (nm) | regeneration processing (nm) | regeneration processing ($m^2/g$) |
| Example 19 | CZY | Pt | 0.5 | Fe | 0.00256 | 1 | 1.96 | 1.45 | 19.8 |
| Example 20 | CZY | Pt | 0.5 | Fe | 0.00513 | 2 | 1.76 | 1.46 | 12.3 |
| Example 21 | CZY | Pt | 0.5 | Fe | 0.01281 | 5 | 3.31 | 1.78 | 10.4 |
| Example 22 | CZY | Pt | 0.5 | Fe Ba | Each 0.00256 | Each 1 | 2.02 | 1.83 | 13.3 |
| Example 23 | CZY | Pt | 0.5 | Fe Ba | Each 0.00256 | Each 1 | 1.62 | 1.49 | 12.5 |
| Example 25 | CZY | Pt | 0.5 | no | 0 | 0 | 3.93 | 3.62 | 26.3 |
| Example 26 | CZY | Pt | 0.5 | Fe | 0.00128 | 0.5 | 3.41 | 3.02 | 23.1 |
| Example 27 | CZY | Pt | 0.5 | Fe | 0.03844 | 15 | 138 | 5.62 | 0.6 |

As apparent also from the results indicated in Table 8, it has been ascertained that the catalysts for purification of exhaust gas of the present invention obtained in Examples 19 to 23 in which the molar ratio of Fe to Pt (Fe/Pt) ranges from 0.8 to 12 are inhibited in their grain growth of Pt after rich/lean endurance testing as compared with the catalysts for purification of exhaust gas obtained in Example 25 in which the value of Fe/Pt is 0 and in Examples 26 and 27 in which the value of Fe/Pt is out of the range from 0.8 to 12. Furthermore, it has been ascertained that, in the catalysts for purification of exhaust gas of the present invention (Examples 19 to 23), the Pt particle diameter after regeneration processing is small, so that catalytic activity can be sufficiently regenerated, thereby being capable of obtaining high catalytic activity. In addition, it has been ascertained that, when the amount of Fe supported on the support is small as in the catalyst obtained in Example 26, the advantage of micronization of particles during the inhibition of the grain growth of Pt and regeneration processing is likely to be insufficient, while the specific surface area of a support tends to decrease when the amount of Fe supported on the support is large as in the catalyst obtained in Example 27. Additionally, from the results of the catalysts for purification of exhaust gas obtained Examples 22 and 23, it has been ascertained that Ba (addition component) is advantageously supported even prior to supporting of Pt or even simultaneously with supporting of Pt.

From the above-described results (Tables 6 to 8), in the catalysts for purification of exhaust gas of the present invention (Examples 18 to 27, particularly Examples 18 to 23), it has been ascertained that the grain growth of a noble metal is sufficiently inhibited. In addition, it has been ascertained that a noble metal is sufficiently micronized in the catalysts for purification of exhaust gas of the present invention (Examples 18 to 27, particularly Examples 18 to 23) by means of the regeneration method of the present invention, being easily capable of regenerating catalytic activity.

Example 28

First, a cerium-zirconium-praseodymium-lanthanum composite oxide ($CeO_2$—$ZrO_2$—$Pr_2O_3$—$La_2O_3$) was produced as a support. In other words, first, 217.3 g of a 28 wt % aqueous cerium nitrate solution, 205.4 g of a 18 wt % aqueous zirconium oxynitrate solution, 2.18 g of praseodymium nitrate, 2.89 g of lanthanum nitrate and 10 g of a nonionic surfactant (available from Lion Corporation, trade name: Leocon) were dissolved in 2 L of ion exchanged water and 25 wt % aqueous ammonia of 1.2-time equivalent to the cation was added thereto and then the resulting co-precipitate was filtrated and washed to obtain a support precursor. Next, the resulting support precursor was dried at 110° C. and then calcined at 1000° C. for 5 hours in the atmosphere to obtain a support of a calcium fluoride structure including a cerium-zirconium-praseodymium-lanthanum composite oxide (composition ratio: 53 mol % $CeO_2$, 45 mol % $ZrO_2$, 0.5 mol % $Pr_2O_3$, 0.5 mol % $La_2O_3$, amount M of a metal element relative to that of the support (in terms of metal): 55 mol %). In addition, the lattice constant of the resulting support was 5.304 Å.

Next, a noble metal was supported on the support to produce a catalyst for purification of exhaust gas of the present invention. In other words, to a mixture solution prepared by mixing 0.625 g of a nitric acid aqueous solution of dinitrodiaminep latinum (platinum concentration: 4% by weight) with 200 ml of ion exchanged water was added 25 g of the support obtained as described above to perform impregnation supporting, and then the resulting material was calcined at 500° C. for 3 hours in the atmosphere to obtain a catalyst for purification of exhaust gas (Pt (0.1 g)/$CeO_2$—$ZrO_2$—$Pr_2O_3$—$La_2O_3$ (100 g)) of the present invention.

Example 29

First, a cerium-zirconium-praseodymium-yttrium composite oxide ($CeO_2$—$ZrO_2$—$Pr_2O_3$—$Y_2O_3$) was produced as a support. In other words, first, 218.1 g of a 28 wt % aqueous cerium nitrate solution, 201.7 g of a 18 wt % aqueous zirconium oxynitrate solution, 2.19 g of praseodymium nitrate, 5.13 g of yttrium nitrate and 10 g of a nonionic surfactant (available from Lion Corporation, trade name: Leocon) were dissolved in 2 L of ion exchanged water and 25 wt % aqueous ammonia of 1.2-time equivalent to the cation was added thereto and then the resulting co-precipitate was filtrated and washed to obtain a support precursor. Next, the resulting support precursor was dried at 110° C. and then calcined at 1000° C. for 5 hours in the atmosphere to obtain a support of a calcium fluoride structure including a cerium-zirconium-praseodymium-yttrium composite oxide (composition ratio: 53 mol % $CeO_2$, 44 mol % $ZrO_2$, 0.5 mol % $Pr_2O_3$, 1 mol % $Y_2O_3$, amount M of a metal element relative to that of the support (in terms of metal): 56 mol %). In addition, the lattice constant of the resulting support was 5.304 Å.

Next, a noble metal was supported on the support to produce a catalyst for purification of exhaust gas of the present invention. In other words, to a mixture solution prepared by mixing 1.563 g of a nitric acid aqueous solution of dinitrodiamineplatinum (platinum concentration: 4% by weight) with 200 ml of ion exchanged water was added 25 g of the support obtained as described above to perform impregnation supporting, and then the resulting material was calcined at 500° C. for 3 hours in the atmosphere to obtain a catalyst for purification of exhaust gas (Pt (0.25 g)/$CeO_2$—$ZrO_2$—$Pr_2O_3$—$Y_2O_3$ (100 g)) of the present invention.

Example 30

First, a cerium-zirconium composite oxide ($CeO_2$—$ZrO_2$) was produced as a support. In other words, first, 273.3 g of a 28 wt % aqueous cerium nitrate solution, 130.4 g of a 18 wt % aqueous zirconium oxynitrate solution and 10 g of a nonionic surfactant (available from Lion Corporation, trade name: Leocon) were dissolved in 2 L of ion exchanged water and 25 wt % aqueous ammonia of 1.2-time equivalent to the cation was added thereto and then the resulting co-precipitate was filtrated and washed to obtain a support precursor. Next, the resulting support precursor was dried at 110° C. and then calcined at 1000° C. for 5 hours in the atmosphere to obtain a support of a calcium fluoride structure including a cerium-zirconium composite oxide (composition ratio: 70 mol % $CeO_2$, 30 mol % $ZrO_2$, amount M of a metal element relative to that of the support (in terms of metal): 70 mol %). In addition, the lattice constant of the resulting support was 5.334 Å.

Next, a noble metal was supported on the support to produce a catalyst for purification of exhaust gas of the present invention. In other words, to a mixture solution prepared by mixing 1.563 g of a nitric acid aqueous solution of dinitrodiamineplatinum (platinum concentration: 4% by weight) with 200 ml of ion exchanged water was added 25 g of the support obtained as described above to perform impregnation supporting, and then the resulting material was calcined at 500° C. for 3 hours in the atmosphere to obtain a catalyst for purification of exhaust gas (Pt (0.25 g)/$CeO_2$—$ZrO_2$ (100 g)) of the present invention.

Example 31

First, a cerium-zirconium-yttrium composite oxide ($CeO_2$—$ZrO_2$—$Y_2O_3$) was produced as a support. In other words, first, 242.6 g of a 28 wt % aqueous cerium nitrate solution, 157.6 g of a 18 wt % aqueous zirconium oxynitrate solution, 12.6 g of yttrium nitrate and 10 g of a nonionic surfactant (available from Lion Corporation, trade name: Leocon) were dissolved in 2 L of ion exchanged water and 25 wt % aqueous ammonia of 1.2-time equivalent to the cation was added thereto and then the resulting co-precipitate was filtrated and washed to obtain a support precursor. Next, the resulting support precursor was dried at 110° C. and then calcined at 1000° C. for 5 hours in the atmosphere to obtain a support of a calcium fluoride structure including a cerium-zirconium-yttrium composite oxide (composition ratio: 60 mol % $CeO_2$, 35 mol % $ZrO_2$, 2.5 mol % $Y_2O_3$, amount M of a metal element relative to that of the support (in terms of metal): 65 mol %). In addition, the lattice constant of the resulting support was 5.305 Å.

Next, a noble metal was supported on the support to produce a catalyst for purification of exhaust gas of the present invention. In other words, to a mixture solution prepared by mixing 0.169 g of barium nitrate with 200 ml of ion exchanged water was added 25 g of the support obtained as described above to perform impregnation supporting, and then the resulting material was calcined at 500° C. for 5 hours in the atmosphere to obtain a catalyst precursor. Then, to a mixture solution prepared by mixing 1.563 g of a nitric acid aqueous solution of dinitrodiamineplatinum (platinum concentration: 4% by weight) with 200 ml of ion exchanged water was added 25 g of the support obtained as described above to perform impregnation supporting, and then the resulting material was calcined at 500° C. for 3 hours in the atmosphere to obtain a catalyst for purification of exhaust gas (Pt (0.5 g)/$CeO_2$—$ZrO_2$—$Y_2O_3$—BaO (100 g)) of the present invention.

Example 32

A catalyst for purification of exhaust gas (Pt (0.5 g)/$CeO_2$—$ZrO_2$—$Y_2O_3$—BaO (100 g)) of the present invention was obtained in the same manner as in Example 31 except that the amount of barium nitrate that was mixed with the mixture solution was changed to 0.338 g.

Example 33

A catalyst for purification of exhaust gas (Pt (0.5 g)/$CeO_2$—$ZrO_2$—$Pr_2O_3$—$La_2O_3$ (100 g)) of the present invention was obtained in the same manner as in Example 28 except that the amount of the nitric acid aqueous solution of dinitrodiamineplatinum (platinum concentration: 4% by weight) that was mixed with the mixture solution was changed to 3.125 g.

Example 34

A catalyst for purification of exhaust gas (Pt (1 g)/$CeO_2$—$ZrO_2$—$Pr_2O_3$—$La_2O_3$ (100 g)) of the present invention was obtained in the same manner as in Example 28 except that the amount of the nitric acid aqueous solution of dinitrodiamineplatinum (platinum concentration: 4% by weight) that was mixed with the mixture solution was changed to 6.25 g.

Example 35

A catalyst for purification of exhaust gas (Pt (0.25 g)/$CeO_2$—$ZrO_2$ (100 g)) of the present invention was obtained in the same manner as in Example 30 except that the nonionic surfactant was not mixed.

<Endurance Testing A (1000° C.)>

A rich/lean endurance test imitating the endurance mode of a three-way catalyst was carried out by using the catalysts for purification of exhaust gas obtained in Examples 28 to 30 and 34 and 35. In other words, first, each catalyst was ground to a size from 0.5 to 1 mm by using a cold isostatical press method (CIP method) at a pressure of 1 t/cm² to produce a pellet-shaped catalyst. Next, a rich gas (CO (3.75% by volume)/$H_2$ (1.25% by volume)/$H_2O$ (3% by volume)/$N_2$ (balance) and a lean gas ($O_2$ (5% by volume)/$H_2O$ (3% by volume)/$N_2$ (balance), so as to be 333 cc/min for 1.5 g of the resultant pellet-shaped catalyst, were alternately flowed in (in a model gas atmosphere) every 5 minutes and maintained at a temperature condition of 1000° C. for 5 hours (Endurance Testing A). The specific surface area and the average particle diameter of a noble metal after such endurance testing were evaluated, with the results obtained shown in Table 10. In addition, the average particle diameter of a noble metal after such endurance testing was evaluated by the CO chemisorption method described in JP 2004-340637 A.

Additionally, the ratio (V/X) of the amount of Pt (V) supported on the support to the standard value X obtained by calculating Equation (4) below:

$$X = (\sigma/100) \times S/s \div N \times M_{nm} \times 100 \quad (4)$$

wherein σ, S, s, N and $M_{nm}$ are defined in Equation (1) was obtained by using a specific surface area value after such endurance testing. The results obtained are listed in Table 10. Moreover, the ratios (V/X) of the amounts of supporting of Pt (V) to the standard values X obtained by calculating Equation (4) for the catalysts for purification of exhaust gas (Examples 28 to 30) of the present invention were respectively about 0.59 (Example 28), about 1.23 (Example 29) and about 0.51 (Example 30). On the other hand, the ratios (V/X) for the catalysts for purification of exhaust gas (Examples 34 and 35) were respectively about 5.58 (Example 34) and about 7.50 times (Example 35).

<Evaluation of Three-Way Catalyst Activity>

By use of each of the catalysts for purification of exhaust gas obtained in Examples 28, 30, 34 and 35 (initial) and the catalysts for purification of exhaust gas of Examples 28, 30, 34 and 35 after Endurance Testing A, a variable environment gas prepared by using CO (75% by volume)/$H_2$ (25% by volume) or $O_2$ (100% by volume) for a stoichiometry model gas indicated in Table 9 such that λ=1±0.02 (2 sec) was flowed to 1 g of a catalyst at a flow rate of 3.5 L/min, and the catalyst was subjected to treatment at 550° C. for 10 minutes, followed by treatment by a rate of temperature rise of 12° C./min from 100° C. to 550° C. to determine a 50% purification temperature of each component. The 50% purification temperature of propylene ($C_3H_6$) is shown in Table 10. In addition, the 50% purification temperature of propylene ($C_3H_6$) shown in Table 10 is a measure of three-way catalyst performance, and means that the lower the temperature, the higher the activity of the catalyst.

Moreover, on the basis of the catalyst for purification of exhaust gas obtained in Example 28 (initial), the amounts of CO adsorption per amount of Pt after Endurance Testing A were compared (measurement of specific activity). The results are listed in Table 10. In addition, the value of specific activity obtained in this manner indicates an activity higher than the activity of a catalyst (initial) obtained in Example 28 as the value is larger than 1, indicates that, as the value becomes closer to 1, the activity of the catalyst obtained in Example 28 (initial) is closer to the activity per amount of Pt, and indicates, as the value becomes smaller to 1, the activity per amount of Pt is lower than the activity of a catalyst (initial) obtained in Example 28.

TABLE 9

| | | | Vol % | | | |
|---|---|---|---|---|---|---|
| CO(75%)/$H_2$ | $CO_2$ | $O_2$ | NO | $C_3H_6$ | $H_2O$ | $N_2$ |
| 0.6998 | 8 | 0.646 | 0.12 | 0.16 | 5 | balance |

TABLE 10

| | | Specific surface area of support ($m^2$/g) | Pt amount for 100 g of support (g) | Ratio of supporting amount of Pt (V/X) | 50% Purification temperature of $C_3H_6$ (° C.) | CO chemisorption method | | |
|---|---|---|---|---|---|---|---|---|
| | | | | | | Pt particle diameter (nm) | Dispersion degree (%) | Specific activity |
| Example 28 | Initial | | 0.1 | | 240.4 | 0.83 | 59.1 | 1.00 |
| | After Endurance Testing A | 16.2 | | 0.59 | 246.0 | 0.98 | 50.1 | 0.85 |
| Example 29 | Initial | | 0.25 | | | 0.85 | 57.5 | 0.97 |
| | After Endurance Testing A | 16.1 | | 1.23 | | 8.63 | 5.68 | 0.10 |
| Example 30 | After Endurance Testing A | 11.7 | 0.25 | 0.51 | 275.1 | 14.2 | 3.45 | 0.06 |
| Example 34 | Initial | | 1 | | 144.3 | 0.88 | 56.1 | 0.95 |
| | After Endurance Testing A | 17 | | 5.58 | 217.9 | 22.13 | 2.21 | 0.04 |
| Example 35 | After Endurance Testing A | 0.8 | 0.25 | 7.50 | 375.4 | 135.9 | 0.36 | 0.01 |

The result of three-way catalyst performance (50% purification temperature of propylene) after endurance testing of each of the catalysts for purification of exhaust gas obtained in Examples 28 and 34 indicated in Table 10 shows that the catalyst obtained in Example 34 with the amount of Pt supported on the support being 10 times that of the catalyst obtained in Example 28 exhibits higher activity. However, the value of specific activity of the catalyst obtained in Example 34 after endurance testing is lowered to 0.04, while the catalyst obtained in Example 28 even after endurance testing held as high a value as 0.85 in its specific activity value. From these results, it has been ascertained that the deterioration of catalyst performance can be sufficiently inhibited. This is estimated to be attributable to the fact as follows. That is, in a catalyst for purification of exhaust gas obtained in Example 28, a performance difference prior to and after endurance testing is small because sufficient holding sites for the number of noble metal atoms are present on the support surface leading to the inhibition of Pt grain growth. On the other hand, in a catalyst for purification of exhaust gas obtained in Example 34, a decrease in catalytic activity to initial performance is remarkable because extra Pt atoms are grain-grown after endurance testing.

In addition, the comparison of three-way catalyst performances (50% purification temperature of propylene) of the catalysts for purification of exhaust gas obtained in Examples 30 and 35 after endurance testing reveals that, although having the same amount of Pt and the same support composition, the two catalysts have an almost 100° C. difference in 50% purification temperature of propylene. These results are estimated to be attributable to the fact that the support used for the catalyst for purification of exhaust gas obtained in Example 35 has an insufficient surface area even if it has the same composition as the support used for catalyst for purification of exhaust gas obtained in Example 29 and thus has no sufficient sites to the number of noble metal atoms on the support surface, being incapable of holding the noble metal in a high dispersion state.

<Endurance Testing B (950° C.)>

A rich/lean endurance test imitating the endurance mode of a three-way catalyst was carried out by using the catalysts for purification of exhaust gas obtained in Examples 28, 29 and 31 to 34. In other words, firstly, each catalyst was ground to a size from 0.5 mm to 1 mm by using a cold isostatical press method (CIP method) at a pressure of 1 t/cm$^2$ to produce a pellet-shaped catalyst. Next, a rich gas (CO (5% by volume)/ CO$_2$ (10% by volume)/H$_2$O (3% by volume)/N$_2$ (balance) and a lean gas (02 (5% by volume)/CO$_2$ (10% by volume)/ H$_2$O (3% by volume)/N$_2$ (balance), so as to be 500 cc/min for 3 g of the resultant pellet-shaped catalyst, were alternately flowed in (in a model gas atmosphere) every 5 minutes and maintained at a temperature of 950° C. for 5 hours (Endurance Testing).

The specific surface area of each catalyst and an average particle diameter of a noble metal after such endurance testing were evaluated, the results obtained listed in Table 11. In addition, the average particle diameter of noble metal particles was evaluated by the CO chemisorption method described in JP 2004-340637 A.

<Regeneration Processing Conditions>

0.7 g of each of the catalysts for purification of exhaust gas obtained in Examples 28, 29 and 31 to 34 after Endurance Testing B was subjected to oxidation treatment (re-dispersion processing) at 800° C. for 15 minutes in an atmosphere in which a gas including O$_2$ (20% by volume)/He (80% by volume) was flowed in so as to be 150 ml/min for 0.7 g of a catalyst to try to re-dispersion of a noble metal. The average particle diameters of the noble metal particles of the catalysts for purification of exhaust gas after such re-dispersion processing are each shown in Table 11. In addition, the average particle diameter of a noble metal was evaluated by the CO chemisorption method described in JP 2004-340637 A. Such re-dispersion processing and the reduction pre-treatment by the CO chemisorption method have achieved the oxidation and reduction treatments of each catalyst for purification of exhaust gas, which have been regarded as regeneration processing.

TABLE 11

| | | Specific surface area of support (m$^2$/g) | Pt amount for 100 g of support (g) | Ratio of supporting amount of Pt (V/X) | CO chemisorption method | | Specific activity |
| | | | | | Pt particle diameter (nm) | Dispersion degree (%) | |
|---|---|---|---|---|---|---|---|
| Example 28 | Initial | | 0.1 | | 0.83 | 59.1 | 1.00 |
| | After Endurance Testing B | 24.6 | | 0.39 | 0.94 | 52.1 | 0.88 |
| | After regeneration processing | 24.6 | | | 0.88 | 56.5 | 0.96 |
| Example 29 | Initial | | 0.25 | | 0.85 | 57.5 | 0.97 |
| | After Endurance Testing B | 24.2 | | 0.82 | 4.00 | 12.3 | 0.21 |
| | After regeneration processing | 24.2 | | | 1.70 | 29.7 | 0.50 |
| Example 31 | initial | | 0.5 | 0.77 | 0.93 | 52.9 | 0.90 |
| | After Endurance Testing B | 20.6 | | | 2.31 | 21.3 | 0.36 |
| | After regeneration processing | 20.6 | | | 1.76 | 27.6 | 0.47 |
| Example 32 | Initial | | 0.5 | | 0.95 | 51.5 | 0.87 |
| | After Endurance Testing B | 15.1 | | 1.05 | 1.93 | 25.4 | 0.43 |
| | After regeneration processing | 15.1 | | | 1.74 | 28.2 | 0.48 |
| Example 33 | initial | | 0.5 | | 0.85 | 57.4 | 0.97 |
| | After Endurance Testing B | 25.3 | | 1.88 | 4.84 | 10.1 | 0.17 |
| | After regeneration processing | 25.3 | | | 2.10 | 23.0 | 0.39 |
| Example 34 | initial | | 1 | | 0.88 | 56.1 | 0.95 |
| | After Endurance Testing B | 19.1 | | 4.97 | 8.79 | 5.6 | 0.09 |
| | After regeneration processing | 19.1 | | | 3.97 | 12.4 | 0.21 |

As apparent also from the results listed in Table 11, it has been ascertained that the grain growth of Pt after endurance testing in the catalysts for purification of exhaust gas obtained in Examples 28, 29 and 31 to 33 is inhibited. In addition, it has been ascertained that, in the catalysts for purification of exhaust gas obtained in Examples 28, 29 and 31 to 33, the activity of the unit amount of Pt (specific activity) is as high as 1.17 or higher even after endurance testing and further regeneration processing micronizes the particle diameter of Pt, causing the specific activity to be regenerated to near 0.4. On the other hand, it has been ascertained that the noble metal grain-grows and its specific activity also decreases to 0.1 or lower in the catalyst for purification of exhaust gas obtained in Example 34. Additionally, it has been ascertained that the specific activity is not much improved although regeneration processing is applied thereto.

In addition, it has been ascertained that the catalysts for purification of exhaust gas obtained in Examples 31 and 32 are obtained by supporting barium of an alkaline earth metal on the surface of a support and then supporting a noble metal and that the grain growth of Pt is further inhibited. This result is estimated to be due to basicity improvement of a support by addition of barium. Additionally, the ratio of the amount of Pt (V) supported on the support to the standard value X of Table 11 obtained by calculating Equation (4) is estimated to be small as compared with the actual value since the ratio is calculated assuming that the amount of barium supported on a support is uniformly distributed on the whole bulk. Also in the catalyst for purification of exhaust gas obtained in Example 33, it has been ascertained that the grain growth of Pt is inhibited and that regeneration processing micronizes Pt leading to regeneration of its specific activity. It has been ascertained that their effects are further remarkable in the catalysts for purification of exhaust gas obtained in Examples 31 and 32.

INDUSTRIAL APPLICABILITY

As described so far, according to the present invention, it is possible to provide a catalyst for purification of exhaust gas that can sufficiently inhibit aggregation of noble metal particles to sufficiently inhibit grain growth of the noble metal even if exposed to high temperature exhaust gas for a long period of time, thereby being capable of sufficiently inhibiting lowering of catalytic activity and can re-disperse the noble metal particles in a short time to readily regenerate catalytic activity when subjected to grain growth upon use even if the noble metal particles are in a relatively low temperature region, as well as is capable of easily regenerating itself albeit in a state in which the catalyst is installed in an exhaust system of an internal combustion engine and a regeneration method for the catalyst for purification of exhaust gas, and an apparatus for purification of exhaust gas and a method for purification of exhaust gas using the catalyst for purification of exhaust gas.

Accordingly, the present invention is extremely useful as a technique for using a catalyst for purification of exhaust gas for removing harmful components such as HC, CO and $NO_x$ in exhaust gas emitted from automobile engines over a long period of time without deteriorating catalytic activity.

The invention claimed is:

1. A catalyst for purification of exhaust gas in which a noble metal is supported on a metal-oxide support, wherein
the support contains a composite oxide of zirconia and/or alumina, and at least one element selected from the group consisting of alkaline earth metal elements, rare earth elements and 3A group elements,
an addition component supported on the support, and containing at least one element selected from the group consisting of alkaline earth metal elements, rare earth elements and 3A group elements,
an amount of the noble metal supported on the support ranges from 0.05% to 2% by mass to the mass of the catalyst, and a molar ratio (amount of addition component/amount of noble metal) of an amount of the addition component supported on the support to the amount of the noble metal ranges from 0.5 to 20 in terms of metal,
in an oxidation atmosphere, the noble metal exists on the surface of the support in high oxidation state, and the noble metal binds with a cation of the support via an oxygen atom on the surface of the support to form a surface oxide layer, and
in a reduction atmosphere, the noble metal exists on the surface of the support in a metal state, and an amount of noble metal exposed at the surface of the support, measured by CO chemisorption, is 10% or more in atomic ratio to a whole amount of the noble metal supported on the support.

2. The catalyst for purification of exhaust gas according to claim 1, wherein
the noble metal is at least one element selected from the group consisting of platinum, palladium and rhodium.

3. The catalyst for purification of exhaust gas according to claim 1, wherein
a value of the binding energy of the 1s orbital of an oxygen atom within the support indicates a value of 531 eV or less.

4. The catalyst for purification of exhaust gas according to claim 1, wherein
an electronegativity of at least one cation among cations in the support is lower than the electronegativity of zirconium.

5. The catalyst for purification of exhaust gas according to claim 1, wherein
a molar ratio of a cation to the noble metal (cation/noble metal) is 1.5 or more, the cation being exposed at the surface of the support and having an electronegativity lower than the electronegativity of zirconium.

6. The catalyst for purification of exhaust gas according to claim 1, wherein
the support contains a composite oxide of zirconia and/or alumina, and at least one element selected from the group consisting of magnesium, calcium, barium, lanthanum, cerium, neodymium, praseodymium, yttrium and scandium.

7. The catalyst for purification of exhaust gas according to claim 1, wherein
the addition component contains at least one element selected from the group consisting of magnesium, calcium, neodymium, praseodymium, barium, lanthanum, cerium, yttrium and scandium.

8. The catalyst for purification of exhaust gas according to claim 1, further comprising iron supported on the support, wherein
a molar ratio (amount of iron/amount of noble metal) of an amount of the iron supported on the support to the amount of the noble metal ranges from 0.8 to 12 in terms of metal.

9. The catalyst for purification of exhaust gas according to claim 1; wherein
the support is a support having a fluorite structure and containing a composite oxide of zirconium and at least one metal element including cerium and selected from the group consisting of rare earth elements and alkaline earth metal elements; and
an amount of the metal element contained in the support ranges from 51 mol % to 75 mol % in terms of metal relative to the support; an amount of cerium contained in the metal element is in a range of 90 mol % or higher in terms of metal relative to the metal element; and an amount of the noble metal supported on 100 g of the support is less than or equal to twice the standard value X and ranges from 0.01 g to 0.8 g, the standard value X being calculated by Equation (1):

$$X=(\sigma/100) \times S/s \div N \times M_{nm} \times 100 \qquad (1)$$

where X represents the standard value (unit: g) of the amount of the noble metal for 100 g of the support; σ represents a probability (unit: %) in which the metal element is surrounded by the metal element, the probability σ being calculated by Equation (2)

$$\sigma = M - 50 \quad (2)$$

where M represents the ratio (units: mol %) of the metal element contained in the support; S represents a specific surface area (units: m²/g) of the support; s represents a unit area (units: Å²/number) per one cation, the unit area s being calculated by Equation (3)

[Formula 1]

$$s = \{a^2 + (\sqrt{2}) \times a^2 + (\sqrt{3}/2) \times a^2\}/3 \div 2 \quad (3)$$

where a represents a lattice constant (unit: Å); N represents Avogadro's number (6.02×10²³ (unit: number); and $M_{nm}$ represents the atomic weight of the noble metal supported on the support.

10. A regeneration method for a catalyst for purification of exhaust gas, wherein
oxidation treatment of heating in an oxidation atmosphere containing oxygen and reduction treatment are applied to the catalyst for purification of exhaust gas according to claim 1.

11. The regeneration method according to claim 10, wherein
the temperature in the oxidation treatment is from 500° C. to 1000° C.

12. The regeneration method according to claim 10, wherein
the oxygen concentration in the oxidation atmosphere is 1% by volume or higher.

13. The regeneration method according to claim 10, wherein
the oxidation treatment and the reduction treatment are applied in a state in which the catalyst for purification of exhaust gas is installed in an exhaust system of an internal combustion engine.

14. The regeneration method according to claim 10, comprising:
a step of mounting a temperature sensor on the catalyst for purification of exhaust gas and then determining the extent of deterioration of the catalyst for purification of exhaust gas on the basis of an operation time and a temperature detected by the temperature sensor; and
a step of initiating the regeneration processing after the catalyst is determined to be in a deterioration state.

15. The regeneration method according to claim 10, comprising:
a step of determining a deterioration state of the catalyst for purification of exhaust gas by using a catalyst deterioration diagnosing device for determining the deterioration state of the catalyst for purification of exhaust gas; and
a step of initiating the regeneration processing after the catalyst is determined to be in a deterioration state.

16. An apparatus for purification of exhaust gas, comprising:
an exhaust gas feeding tube,
a catalyst for purification of exhaust gas according to claim 1, the catalyst being placed inside the exhaust gas feeding tube,
a temperature sensor mounted on the catalyst for purification of exhaust gas, and
a control means for determining the extent of deterioration of the catalyst for purification of exhaust gas on the basis of an operation time and a temperature detected by the temperature sensor and controlling so as to initiate regeneration processing of applying oxidation treatment of heating in an oxidation atmosphere containing oxygen, and reduction treatment, after the catalyst is determined to be in a deterioration state.

17. An apparatus for purification of exhaust gas, comprising:
an exhaust gas feeding tube,
a catalyst for purification of exhaust gas according to claim 1, the catalyst being placed inside the exhaust gas feeding tube,
a catalyst deterioration diagnosing device for determining the deterioration state of the catalyst for purification of exhaust gas, and
a control means for controlling so as to initiate regeneration processing of applying, to the catalyst, oxidation treatment of heating in an oxidation atmosphere containing oxygen, and reduction treatment, after the deterioration state of the catalyst for purification of exhaust gas is determined by means of the catalyst deterioration diagnosing device.

18. A method for purification of exhaust gas, comprising purifying exhaust gas by bringing the exhaust gas into contact with a catalyst for purification of exhaust gas according to claim 1.

* * * * *